United States Patent
Grippo et al.

(10) Patent No.: US 7,602,710 B2
(45) Date of Patent: Oct. 13, 2009

(54) CONTROLLING TIME-SENSITIVE DATA IN A PACKET-BASED NETWORK

(75) Inventors: Ronald V. Grippo, Red Bank, NJ (US);
Kenneth R. St. Hilaire, Hollis, NH (US); Fardad Farahmand, Wellesley, MA (US); Wassim Matragi, North Andover, MA (US); Sunil K. Menon, Acton, MA (US); James A. Pasco-Anderson, Needham, MA (US); Glenn W. Stewart, Chelmsford, MA (US); William C. Templeton, Westford, MA (US)

(73) Assignee: Sonus Networks, Inc., Westford, MA (US)

( * ) Notice: Subject to any disclaimer, the term of this patent is extended or adjusted under 35 U.S.C. 154(b) by 740 days.

(21) Appl. No.: 11/238,682

(22) Filed: Sep. 29, 2005

(65) Prior Publication Data

US 2006/0072593 A1    Apr. 6, 2006

Related U.S. Application Data

(60) Provisional application No. 60/614,182, filed on Sep. 29, 2004.

(51) Int. Cl.
*G01R 31/08* (2006.01)
(52) U.S. Cl. .......................... 370/230; 370/352; 370/235
(58) Field of Classification Search .......................... None
See application file for complete search history.

(56) References Cited

U.S. PATENT DOCUMENTS

| | | | |
|---|---|---|---|
| 6,275,493 B1 | 8/2001 | Morris et al. | 370/395 |
| 6,529,499 B1 | 3/2003 | Doshi et al. | |
| 6,765,866 B1 | 7/2004 | Wyatt | |
| 6,873,689 B1 | 3/2005 | Butler et al. | 379/93.05 |
| 6,914,973 B2 | 7/2005 | Marsico | |
| 6,977,933 B2* | 12/2005 | Soncodi et al. | 370/392 |
| 7,248,565 B1* | 7/2007 | Fourie | 370/235 |
| 2002/0093947 A1* | 7/2002 | Allen et al. | 370/352 |
| 2002/0101860 A1* | 8/2002 | Thornton et al. | 370/352 |
| 2002/0141386 A1* | 10/2002 | Minert et al. | 370/352 |
| 2005/0052996 A1* | 3/2005 | Houck et al. | 370/230 |

(Continued)

FOREIGN PATENT DOCUMENTS

WO    WO 00/39971 A1    7/2000

(Continued)

OTHER PUBLICATIONS

International Search Report for PCT Application No. PCT/US2005/034840 mailed on Apr. 4, 2006.

*Primary Examiner*—Bob A Phunkulh
(74) *Attorney, Agent, or Firm*—Proskauer Rose LLP

(57) ABSTRACT

Described are methods and apparatus, including computer program products, for controlling time-sensitive data in a packet-based network. Data associated with a call is received, and the data includes an identifier associated with the data, a data source, or one or more data destinations. The data is associated with a logical trunk group selected from a plurality of logical trunk groups each in communication with the one or more data destinations over a packet-based network. The logical trunk group is selected based in part on the identifier. Calls through the packet-based network are managed based in part on the associated logical trunk group.

47 Claims, 9 Drawing Sheets

U.S. PATENT DOCUMENTS

| | | |
|---|---|---|
| 2005/0094623 A1 | 5/2005 | D'Eletto |
| 2005/0232251 A1 | 10/2005 | Sylvain |
| 2006/0072554 A1 | 4/2006 | Farahmand et al. .......... 370/409 |
| 2006/0072555 A1 | 4/2006 | St. Hilaire et al. .......... 370/352 |

FOREIGN PATENT DOCUMENTS

| | | |
|---|---|---|
| WO | WO 2004/030288 A1 | 4/2004 |

* cited by examiner

CONTROLLING TIME-SENSITIVE DATA IN A PACKET-BASED NETWORK

CROSS REFERENCES TO RELATED APPLICATIONS

This application claims the benefit of U.S. Provisional Application No. 60/614,182, filed on Sep. 29, 2004, the disclosure of which is hereby incorporated herein by reference.

FIELD OF THE INVENTION

The description describes controlling time-sensitive data transmitted over a packet-based network.

Acronyms

The written description employs various acronyms to refer to various services and system components, as follows:
Digital Signal Processor or Digital Signal Processing ("DSP")
Gateway-to-Gateway ("GW-GW")
Graphical User Interface ("GUI")
Internet Protocol ("IP")
Internet Service Provider ("ISP")
Point of Presence ("POP")
Public Switched Telephone Network ("PSTN")
Session Initiation Protocol ("SIP")
Signaling System 7 ("SS7")
Transport Service Access Point ("TSAP")
Virtual Local Area Network ("VLAN")
Voice over Internet Protocol ("VOIP")

BACKGROUND

In general, traditional telephone networks, such as the publicly-switched telephone network ("PSTN"), employ circuitry and switches to connect telephone users across the network to facilitate communication. In such a network, a "trunk" or "trunk circuit" is a connection between distributed switches—a trunk may be a physical wire between the switches or any other way of transmitting data. A "trunk group" is a group of common or similar circuits (i.e., trunks) that originate from the same physical location, e.g., a switchboard. Trunk groups are used to route calls through the traditional network using the telephone number as the routing key that provides routing instructions to distributed switches. After a call link has been established between two switches over a trunk, that trunk is dedicated or "locked up" to that call for the duration of the call, e.g., another call link cannot use that trunk until the call has ended, for example by a hang-up or disconnection. In such a configuration, the trunks impose physical limitations on the amount of data (and hence the number of calls) that may be transmitted over the trunk group. Such limits are based on the capacity of the circuit to transmit data. As physical limits of a trunk group are approached, the number of additional calls that can be routed over that particular trunk group decreases. One known solution to increase the call capacity of a trunk group is to add more trunk circuits to the trunk group.

An emerging alternative to traditional phone networks uses packetized data to transmit content of telephone communications (e.g., voice or videoconferencing data) through a packet-based network such as an Internet Protocol ("IP") network. Such a configuration is commonly referred to as a Voice over Internet Protocol ("VOIP") network and can support voice, data, and video content. A packet-based telephone network employs packet-switches (also referred to as gateways, media gateways, media gateway controllers, switching components, softswitches, data sources, or call processors). A packet assembler can convert a signal received from a traditional telephone network call into a set of data packets for transmission through the IP network.

In contrast to the circuit-based architecture of traditional telephone networks, packet-based networks do not require dedicated circuits for transmitting data associated with a call (sometimes referred to as a call, a call session, a set of data packets, or data packets), and as such, do not encounter the same physical limitations as circuit-switched networks. Packet-based networks include components with an interface to the packet-based network, for example, an IP address. Packet-switches are analogous to circuit-based switches, and data links are analogous to trunk circuits. However, unlike circuit-based network calls, packet-based network calls employ an IP address as the routing key. As the data traffic over a particular data link increases (e.g., up to and exceeding the bandwidth capacity of the data link), existing calls that utilize the particular data link can be affected. For example, the call may be disconnected or problems such as jitter or delay in voice transmission can occur for existing calls due to the increased data traffic.

Although the strict limit on the number of additional calls that a particular trunk can transmit in circuit-based telephony are not present in packet-based telephony, the network itself and the topology of the network can present practical or physical limits on data transmission (e.g., call routing or quality). A chokepoint can develop in a packet-based network when data packets arrive at a packet switch faster than the packet switch can process the data packets. The chokepoint can result in lost or delayed transmission of data packets that affects existing calls. When a packet-switch is a router, the router generally lacks the processor capacity and signaling capability to reroute incoming data packets to prevent further network slowdown due to the chokepoint.

Previous attempts to avoid chokepoints in a network and associated slowdowns have included providing a server to identify an available IP network route based on available bandwidth associated with the route. The route (composed of undefined, ad hoc route segments between IP routers known as "path links") defines a bandwidth capability for data transmission that consists of the sum of bandwidth available on each path link. Therefore, a route can change as available bandwidth of the constituent path links fluctuates. Instead, the server, also called a Virtual Provisioning Server ("VPS"), communicates the route having the most available bandwidth to a signaling gateway that can transmit data over that route defined by the VPS. In such a system, the VPS has knowledge of the topology of the IP network to be able to route the traffic. For example, the VPS obtains available bandwidth and other routing type information from the routers making up the portion of the IP network through which the VPS routes its traffic.

SUMMARY OF THE INVENTION

The description describes controlling or managing time-sensitive data transmitted over a packet-based network. In general, in one aspect, there is a method. The method involves receiving data associated with a call. The data can include a characteristic or an identifier associated with the data, a data source, or one or more data destinations. The method involves associating the data with a logical trunk group selected from a plurality of logical trunk groups each in communication with the one or more data destinations over a packet-based network. The logical trunk group is selected in part based on the identifier. The method involves managing the call associated with the data through the packet-based network based in part on the associated logical trunk group.

In another aspect, there is a system. The system includes a switching module in communication with a packet-based network, the switching module adapted to receive data associated with a call, the data associated with an identifier. The system includes a plurality of logical trunk groups associated with the switching module. Each of the logical trunk groups is associated with one or more data destinations over the packet-based network. The system includes a selector module adapted to associate the data received by the switching module with a first logical trunk group selected from the plurality of logical trunk groups. The system includes a managing module adapted to manage the call associated with the data based in part on the associated logical trunk group.

In another aspect, there is a computer program product, tangibly embodied in an information carrier, the computer program product including instructions being operable to cause data processing apparatus to receive data associated with a call. The data includes an identifier associated with the data, a data source, or one or more data destinations. The computer program product includes instructions being operable to cause data processing apparatus to associate the data with a first logical trunk group selected from a plurality of logical trunk groups each in communication with the one or more data destinations over the packet-based network. The computer program product includes instructions being operable to cause data processing apparatus to manage the call associated with the data based in part on the associated logical trunk group.

In one aspect, there is a method. The method involves collecting information relating to a state of a set of data packets associated with a telephone call through a packet-based network. The state includes a transmitted state, a received state, a queued state, a lost state, or any combination of these. The method involves associating the information with a logical trunk group from a plurality of logical trunk groups or with the packet-based network or both. The method involves determining a performance statistic based in part on the information. The method involves adjusting a resource parameter associated with the packet-based network or the logical trunk group in part in response to the performance statistic.

In other examples, any of the aspects above can include one or more of the following features. In some embodiments, managing a call includes accepting the call, denying the call, transforming the data associated with the call, selecting a destination for the data or the call, transmitting the call over the packet-based network, or any combination of these. Selecting a destination can include selecting a network node for transmitting the data or the call. In some embodiments, a resource parameter is associated with the logical trunk group, and managing the call is based in part on the resource parameter.

In some embodiments, the data source or the data destination, or both, include a gateway, a call processor, a switch, a trunk group, or any combination of these. In some embodiments, a route through the packet-based network is requested. The route is provided and includes a pathway through the packet-based network that is associated with the logical trunk group.

In some embodiments, a resource parameter is associated with the logical trunk group. The resource parameter can include a scalar resource parameter, a vector resource parameter, an operational state resource parameter, or any combination of these. In some embodiments, the data includes a first set of data packets. A state of the first set of data packets can be monitored, where the state includes a transmitted state, a received state, a queued state, a lost state, or any combination of these. A performance statistic associated with one of the call, the logical trunk group, the packet-based network, or any combination of them can be determined based in part on the state.

In some embodiments, the identifier associated with the data, the data source, or the data destinations can include a name, an IP address, a signaling protocol, a transport service access point, a port, a VLAN identifier, or any combination of these. In some embodiments, managing a call includes three cooperating algorithms or layers. The first layer determines the state of the data packets associated with a logical trunk group, and the state provides an input to the second layer. The second layer provides to the third layer a resource parameter associated with the logical trunk group and the resource parameter requirement associated with the second set of data packets. The third layer compares the resource parameter associated with the logical trunk group and the resource parameter requirement of the set of data packets to determine, based on the comparison, whether to associate a second set of data packets with the logical trunk group.

In some embodiments, a performance statistic associated with the packet-based network is based in part on the state of the data packets (e.g., transmitted, received, queued, or lost states). The resource parameter associated with the logical trunk group or the packet-based network can be adjusted based in part on the performance statistic. In some embodiments, the performance statistic is determined according to a PSTN-based standard such as Telcordia GR-477 or TR-746 traffic control and monitoring standards.

A resource parameter can be associated with the logical trunk group, or a second logical trunk group or both. The resource parameter can, for example, include a scalar parameter, a vector parameter, an operational state parameter, or any combination thereof. The resource parameter can be adjusted in part in response to the state, where the state includes a transmitted, received, queued, lost state, or any combination of these. In some embodiments, the resource parameter is adjusted in response to a user-provided configuration. The user-provided configuration can include packet outage duration, outage detection intervals, number of calls detecting packet outage, amount of data detecting packet outage, combinations of these, or other measures.

Implementations can realize one or more of the following advantages. The requirement of centralized control over IP routes (e.g., by a VPS) is eliminated. Additionally, knowledge of the network topology is not required to control time-sensitive data transmission through the IP network. Implementations realize increased scalability because knowledge of network topology is not required. Further advantages include controlling data through an IP network based on characteristics or parameters other than bandwidth capacity. Faster processing and more efficient network resource management is realized due to decreased data communications from a centralized control.

Another advantage includes increased visibility from the perspective of, for example, a network administrator into the IP network backbone. The increased visibility improves network management functions by allowing a network administrator to configure or manipulate call traffic through the IP network based on performance statistics. The performance statistics can provide visibility by reporting on the performance associated with various sets of pathways or calls. The performance statistics also relate to the quality of the IP network and devices used by the network.

In some embodiments, the performance statistics relate to call transmission or data transmission associated with a set of pathways. More particularly, the performance statistics allow a network administrator to track packet transmission through an IP network by only monitoring the devices that transmit and receive data packets. For example, the performance statistics can indicate whether a certain network (e.g., PSTN or IP network) is difficult to reach, which enables a network administrator to route calls around or away from the network that is difficult to reach. The performance statistics can be industry standard statistics such as Telcordia GR-477 or Telcordia TR-746 traffic and networking standards that are used by PSTN administrators or individual statistics developed independently to determine network performance in IP networks. Knowledge of the packet-based network's performance allows an administrator to narrow or tailor troubleshooting efforts to improve performance to those areas within the packet-based network that are experiencing difficulty.

Another advantage associated with increased visibility includes improved ease of migration from circuit-switched telephony networks (e.g., the PSTN) to packet-switched telephony networks (e.g., IP networks) by allowing an administrator to employ similar tools for managing the IP networks as are available for managing the PSTN. One implementation of the invention can provide all of the above advantages.]

The details of one or more examples are set forth in the accompanying drawings and the description below. Further features, aspects, and advantages of the invention will become apparent from the description, the drawings, and the claims.

DETAILED DESCRIPTION

Figure 1:
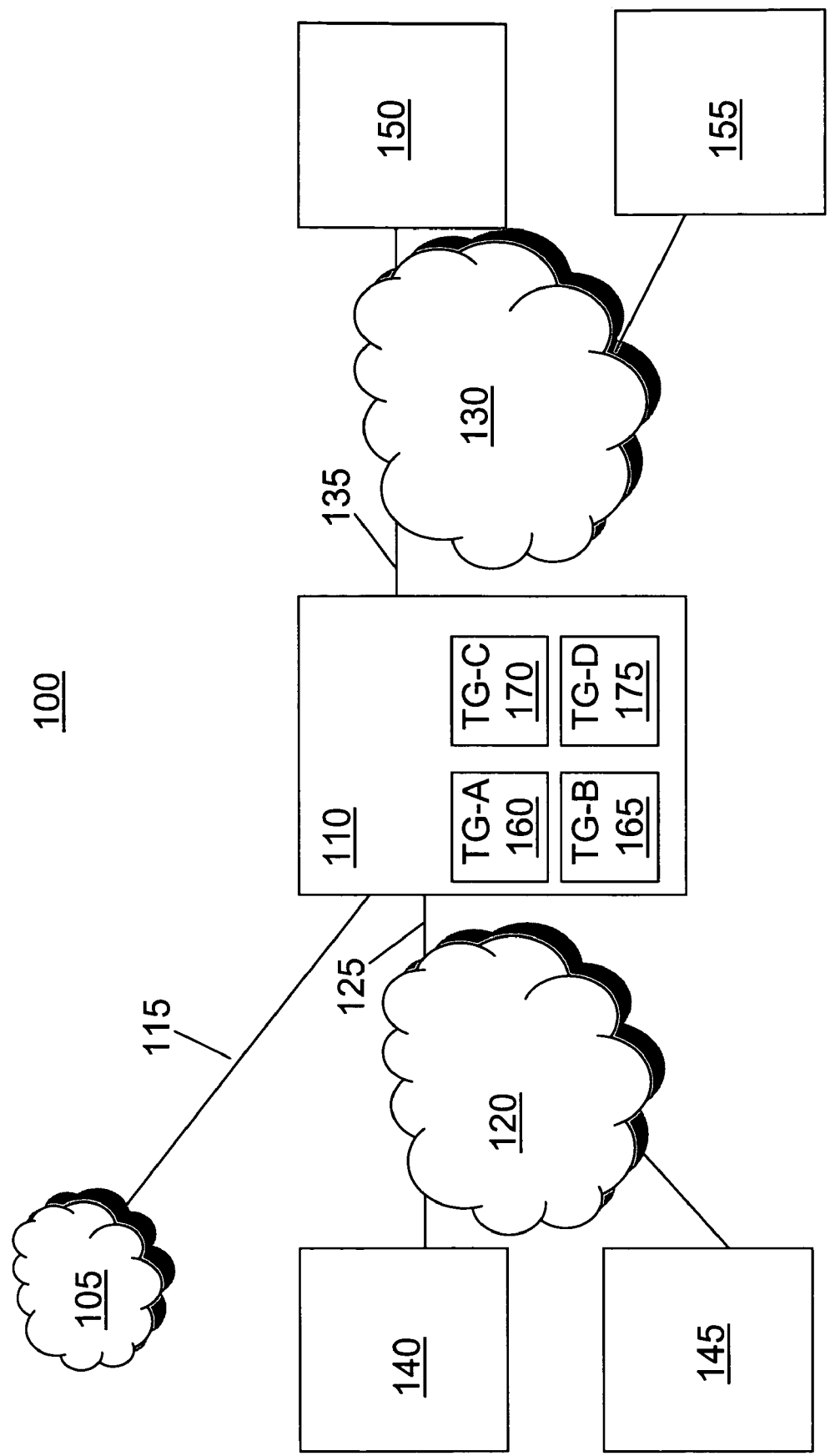
FIGS. 1-3 are block diagrams showing exemplary networks and devices related to routing data associated with a call through a packet-based network.

FIG. 1 depicts a system 100 that includes exemplary networks and devices associated with routing data associated with a call through a packet-based network. Data associated with a call can include one or more sets of data packets and may be referred to herein as data packets, a set or sets of data packets, a call or calls, a call leg, or some combination of these terms. Although in general, the call data described in this description is referencing media data (e.g., voice, video), the call data may also include signaling data without departing from the scope of the invention. The system 100 includes a PSTN 105 that is in communication with a media gateway 110 over communication channel 115. In some examples, the communication channel 115 includes PSTN trunk groups. The gateway 110 can be, for example, a GSX9000 sold by Sonus Networks, Inc., of Chelmsford, Mass.

The gateway 110 is in communication with a first packet network 120 over a communication channel 125. The gateway 110 is also in communication with a second packet network 130 over a communication channel 135. The first packet network 120 and the second packet network 130 can be separate packet networks, for example, one being a public packet network (e.g., the Internet) and one being a private packet network (e.g., an intranet). In other examples, the first packet network 120 and the second packet network 130 can be the same packet network, e.g., the Internet. In such examples, the separation is shown to illustrate egress and ingress call data for the gateway 110.

Using the packet network 120, the gateway 110 communicates with a media gateway 140 and a media gateway 145 (e.g., by transmitting packet data through the packet network 120). Similarly, using the packet network 130, the gateway 110 communicates with a media gateway 150 and a media gateway 155. For example, the media gateways 140, 145, 150, 155 may be located in different geographical areas to allow the service provider to provide national service at reduced costs. For example, the gateway 110 can be in Texas, the gateway 140 can be in Oregon, the gateway 145 can be in California, the gateway 150 can be in Massachusetts, and the gateway 155 can be in New Jersey. As an operational example, a call is received from the PSTN 105 at the gateway 110 and transformed from a circuit-based call into a packet-based call (e.g., by a packet assembler module or a packet assembler disassembler module). The packet data associated with the call is transmitted from the gateway 110 to the appropriate gateway, for example gateway 145, and converted back to a circuit-based call at the gateway 145, if the called party is connected to another portion of the PSTN, or can be left in packet form if the called party is connected directly to a packet-based system (e.g., IP-based telephony).

It is noteworthy that a service provider that manages the gateway 110 does not always have knowledge of the topology of the packet networks 120 and 130, particularly if the packet networks 120 and 130 represent a public packet network such as the Internet. In some embodiments, a service provider obtains access to a packet network through agreements with a third party (e.g., a service-level or quality agreement). One advantageous feature of the described configuration allows the service provider to evaluate or understand the underlying packet network inferentially (e.g., by monitoring traffic or performance statistics), which enables the service provider to verify that the third party is meeting the quality guarantees in the agreement. The gateway 110 transmits the packets associated with the call to the packet network 120 through communication channel 125 and the packet network 120 takes responsibility for routing the packets to the gateway 145. Because the packets are associated with a call, the packets are time-sensitive. As such, problems within the packet network 120 can affect the whether and how fast the packets are transported to the gateway 145. Delays and lost packets lead to a loss of quality of the call.

The gateway 110 advantageously includes logical trunk groups TG-A 160, TG-B 165, TG-C 170, and TG-D 175. Unlike PSTN trunk groups, which correspond to physical communication channels (e.g., wires, fiber optic cables), logical trunk groups represent a virtual communication channel through a packet network. As an exemplary implementation, logical trunk groups can be represented as objects in an objected oriented data processing paradigm.

As an illustrative example, the service provider managing the gateway 110 can define the logical trunk groups 160, 165, 170, and 175 to be associated with the gateways 140, 145, 150, and 155, respectively. In such an example, as the gateway 110 receives calls from the PSTN 105, transforms the call data into packets, and transmits those packets to the appropriate gateway (e.g., the gateways 140, 145, 150, and 155), the gateway 110 associates the packets with the appropriate or corresponding logical trunk group. For example, as a call is received and routed to the gateway 145, the packets associated with that call are associated with the logical trunk group TG-B 165. As additional calls come into gateway 110 and are routed to gateway 145, they are also associated with the logical trunk group TG-B 165. After packet data has been associated with a logical trunk group, statistics about that packet data can be collected and tracked. In some examples, these statistics are aggregated to provide statistics at the call level. In some examples, statistics aggregated at the call level can be aggregated to provide statistics about the logical trunk group (e.g., statistics associated with a group of one or more calls).

For example, for a particular call being routed through the gateway 110 to the gateway 145, statistics are collected on packet delays and lost packets (e.g., based on the number of packets transmitted, received, queued, or lost). These statistics are associated with the logical trunk group TG-B 165. As the quality decreases (e.g., packets lost and delayed increases for each call) for this logical trunk group TG-B 165, the service provider managing the gateway 110 has knowledge that packet network 120 has some issues in the set of pathways from the gateway 110 to the gateway 145, even though the service provider does not necessarily know the topology of the packet network 120. In such examples, the data associated with each logical trunk group models characteristics (e.g., capacity, hardware failures, bandwidth, etc.) of the set of pathways between the gateway 110 and the other gateway(s) associated with the particular logical trunk group. In general, references to the set of pathways between two devices refer to any combination of path links through the packet network (e.g., the packet network 120) from one device (e.g., the media gateway 110) to another device (e.g., the media gateway 145). Advantageously, information associated with the performance of a network (e.g., the packet network 120) can be inferred from statistics associated with "edge devices" such as the gateway 110 and a media gateway 140, 145, 150, 155.

Similar to associating each trunk group with a different media gateway, the logical trunk groups can be associated with more than one media gateway. For example, the service provider managing the gateway 110 can define the logical trunk group TG-A 160 to be associated with the gateways 140 and 145 (e.g., the gateways in communication with the gateway 110 via packet network 120). Likewise, the service provider managing the gateway 110 can define the logical trunk group TG-B 165 to be associated with the gateways 150 and 155 (e.g., the gateways in communication with the gateway 110 via packet network 130). In this example, as a call is received and routed to either the gateway 140 or 145, the packets associated with that call are associated with the logical trunk group TG-A 160.

Service providers whose networks include a portion of the PSTN networks typically have managers that have managed the PSTN using statistics collected about PSTN trunk groups. For example, the Telcordia GR-477 or the Telcordia TR-746 standard on network traffic management deals with PSTN trunk group reservation and PSTN trunk group controls. By establishing logical trunk groups for the packet-based traffic, analogous management techniques can advantageously be applied to the packet-based traffic as is used for the PSTN trunk groups. Managers can quickly adapt to managing the packet-based traffic using their PSTN trunk group skill set.

There are also other advantageous uses for the logical trunk groups. The logical trunk groups can be used to allocate resources and to provision services. For example, the logical trunk group TG-A 160 can represent the network used for calls provided on a retail basis and the logical trunk group TG-B 165 can represent the network used for calls provided on a wholesale basis. Because the retail calls provide a higher margin, limited resources, such as DSPs, can be allocated in higher percentages, or on a higher priority basis, to the calls associated with the logical trunk group TG-A 160, regardless of the final destination of the call data. Similarly, services can be provisioned to a call according to the logical trunk group with which that call is associated.

In some operational examples, the telephone call has certain data associated with that call (e.g., video, voice, signaling). The PSTN 105 communicates the data to a gateway 110, which includes at least one network card with an IP address (e.g., a network interface). In system 100, calls are received by the gateway 110 at a physical location or port (e.g., a DS0 or a DS1 port) from the PSTN 105 over the communication channel 115. The gateway 110 processes the data and transmits the data according to a characteristic of the device receiving the data. For example, in FIG. 1, the device(s) receiving the packetized call data can be the gateway 140, the gateway 145, the gateway 150, and/or the gateway 155. The characteristic can include a name, an IP address, a signaling protocol, a virtual local area network ("VLAN") identifier or any combination of these.

In the illustrated embodiment of FIG. 1, there are four sets of pathways through the packet networks 120 and 130 between the gateway 110 and the four other gateways 140, 145, 150, 155 over which call data can travel. As described above, these four sets of pathways can be associated with the logical trunk groups TG-A 160, TG-B 165, TG-C 170, and TG-D 175. As referred to herein, a "set of pathways" is not necessarily a fixed physical concept but relates to the concept of communications between various network equipment (e.g., the gateway 110 and the media gateway 140) through the packet network 120. In some embodiments, the logical trunk groups TG-A 160, TG-B 165, TG-C 170, and TG-D 175 are referred to as "IP trunk groups" when the networks 120 and 130 are IP-based networks.

Individual pathways (e.g., path links and parallel pathways) are logically associated to form the sets of pathways from one call processing device (e.g., gateway 110) to another call processing device (e.g., gateway 140). One species of logical association involves associating individual pathways based on IP addresses associated with the call processing devices (also referred to herein as call processors) in communication with the pathways (e.g., gateways 110, 140, 145, 150, 155). In some embodiments, an IP trunk group is a named object that represents one or more call processing devices and the data communication paths that connect the network elements.

By associating a logical trunk group with the sets of pathways between two call processing devices, the amount of data transmitted over any of the sets of pathways can be controlled by the gateway 110 as discussed in more detail below with respect to call admission controls (e.g., whether calls are transmitted as determined by statistics associated with a given IP trunk group). Transmission of a call from the gateway 110 over the IP network 120 to the destination gateway 140 (e.g., the set of pathways between the gateway 110 and the gateway 140) is referred to as an "egress call leg" with respect to gateway 110. The egress call leg is associated with an IP trunk group (sometimes referred to as an "egress IP trunk group"). Reception of the call at the destination 140 is referred to as an "ingress call leg" with respect to the destination 140. The ingress call leg is associated with an IP trunk group defined for the gateway 140 (sometimes referred to as an "ingress IP trunk group").

In some embodiments, with respect to the gateway 110, the egress call leg is associated with the same IP trunk group as the ingress call leg, but the egress call leg is not required to be associated with the same IP trunk group as the ingress call leg. In such a configuration, the gateway 110 can be a data or call source with respect to the destination 140 and can include a characteristic that may be used for future call routing (e.g., where the destination 140 provides subsequent call processing and is not the final destination of the call). As described herein, a data source or a data destination can include any gateway, PSTN trunk group, or any set of pathways (e.g., represented by logical trunk groups) with associated characteristics or identifiers.

In some embodiments, a media path is associated with a pathway or set of pathways. The media path transmits out-of-band non-voice data associated with the set of pathways (e.g., for videoconferencing) and can be used in association with IP trunk groups.

Still referring to FIG. 1, data associated with a call is received from a data source, in this example the gateway 140, at the gateway 110 over a particular pathway included in the set of pathways between the gateway 110 and the gateway 140 through the packet network 120. This set of pathways can be associated with the logical trunk group TG-A 160 (e.g., an IP trunk group when the packet-based network 120 is an IP network). The gateway 110 processes the data and associates the data with the logical trunk group TG-A 160 based in part on a characteristic of the data source including name (e.g., FROM_Oregon), IP address of the gateway 140, a transport service access point ("TSAP") associated with the gateway 140, signaling protocol between the gateways 140 and 110, a VLAN identifier associated with one of the gateways 110, 140, or a combination of these.

In some embodiments, the call data is associated with the logical trunk group TG-A 160 based in part on a characteristic of a data destination), and the characteristic can include the name of the destination, the IP address of the destination, a TSAP associated with the destination, the signaling protocol between the destination and the gateway 110, a VLAN identifier associated with the destination or the gateway 110, or any combination of these. Because data is received from the gateway 140 at the gateway 110, the selected logical trunk group is the logical trunk group association for ingress call data.

In some embodiments, data is transmitted in the reverse direction. More particularly, the gateway 110 can be a data source with respect to gateway 140 (e.g., for return data traffic). With respect to the gateway 110, for the egress call data (e.g., call data traveling from the gateway 110 to the gateway 140), the same trunk group or a different trunk group can be used. For example, for all call data, ingress and egress, between the gateways 110 and 140, the trunk group TG-A 160 can be used. For example when IP addresses are the characteristics to determine the association, the IP address of the data source can be used for ingress calls and the IP address of the data destination can be used for the egress calls, which in both cases is the IP address for the gateway 140. In some embodiments, the IP address of either the data source or the data destination can be used for either ingress call legs or egress call legs.

In some examples, the association with the logical trunk group TG-A 160 can be based on the IP address of the data source (e.g., when the data source is the gateway 140) or the data destination. The association with the logical trunk group TG-B 165 can be based on the IP address of the data destination (e.g., when the data destination is the gateway 140) or the data source. In such examples, for ingress calls from the gateway 140, the data is associated with the logical trunk group TG-A 160 and for egress calls to the gateway 140, the data is associated with the logical trunk group TG-B 165). Although the network elements 110, 140, 145, 150, and 155 are referred to repeatedly as gateways, they can also represent groups of signaling peers, points of presence, central offices, network nodes, other telephony equipment and/or the like in communication with the networks 120 and 130 without departing from the scope of the invention.

Calls and associated data received by the gateway 110 from the PSTN 105 can be transmitted through the packet networks 120 and 130 to different destinations 140, 145, 150, and/or 155. Similarly, calls and associated data received by the gateway 110 over the packet networks 120 and 130 from data sources 140, 145, 150, and/or 155 can be transmitted to the PSTN 105 over PSTN trunk group(s) that are included in the communications channel 115. More particularly, the gateway 110 is an interface between circuit-switched networks like the PSTN 105 and packet-based networks 120 and 130. Call data between the PSTN 105 and the gateway 110 is controlled based on circuit availability (e.g., PSTN trunk group management). Call data between the gateway 110 and the other gateways 140, 145, 150, and/or 155 do not have such limitations. There are of course limitations on the packets based on the performance capabilities of the networks 120 and 130. Advantageously, a network administrator can configure the operation of the gateway 110 to impose such limitations and manage the call data transmitted across the packet-based networks 120 and 130 based on performance statistics associated with the logical trunk groups analogous to those techniques and performance statistics used to manage the PSTN trunk groups included in the communication channel 115.

Figure 2:
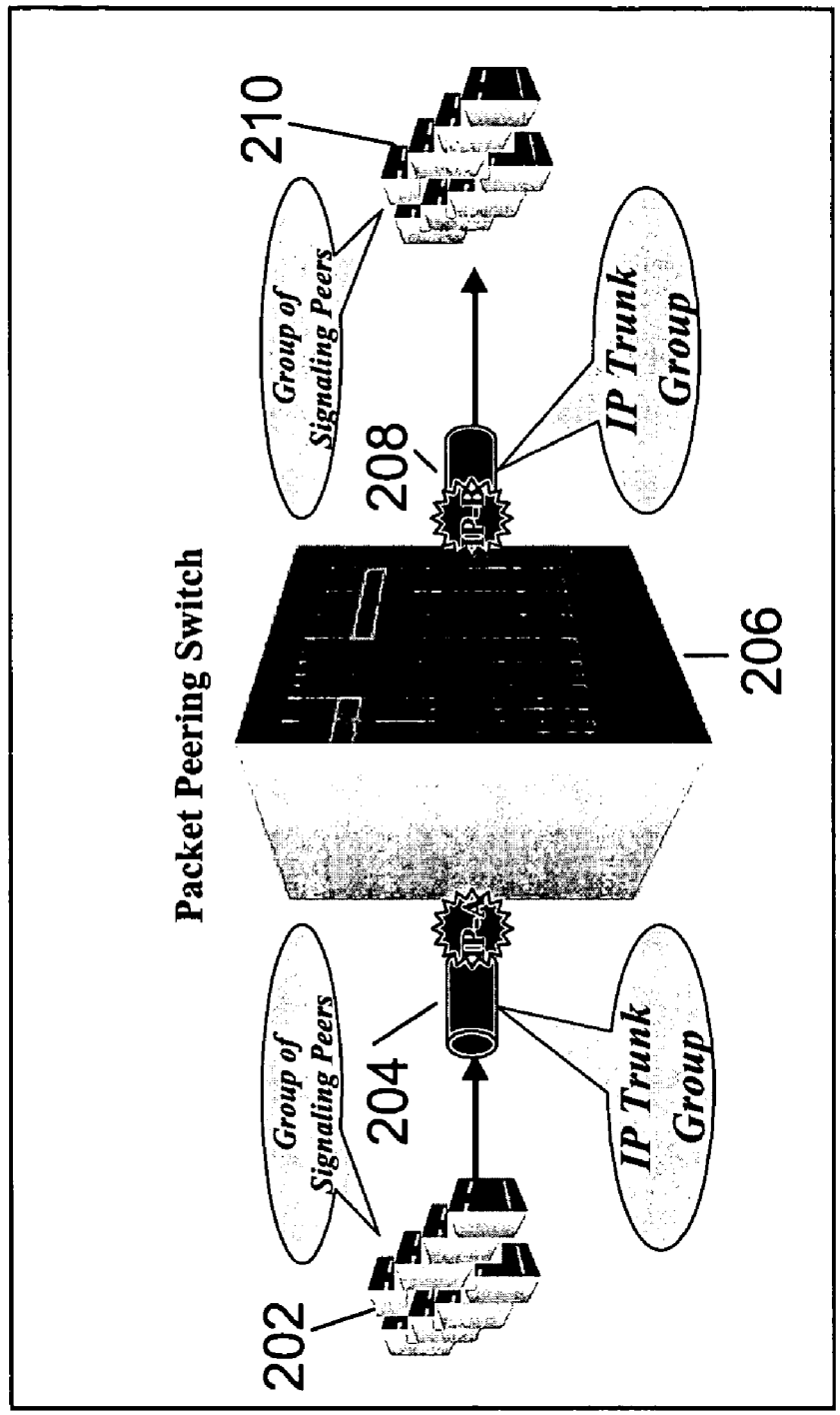

FIG. 2 depicts a system 200 that includes exemplary networks and devices for call routing and control in connection with packet-to-packet call processing. A data source 202, representing a group of call processing devices, transmits data associated with a call over a first set of pathways 204, and the data are received by a switch 206. The switch 206 can include a packet-peering switch for peer-to-peer data transmission. The switch 206 can be, for example, a GSX9000 sold by Sonus Networks, Inc. of Chelmsford, Mass. The switch 206 can then select a second set of pathways 208 to transmit the data to a destination 210, also representing a group of call processing devices.

In system 200, the first set of pathways 204 and the second set of pathways 208 are implemented in an IP-based packet network, so the logical trunk groups are referred to as IP trunk groups. For the switch 206, the first set of pathways 204 and the second set of pathways 208 are each associated with a distinct logical trunk group. Specifically, the first set of pathways 204 is associated with a logical trunk group "IP-A" and the second set of pathways 208 is associated with a logical trunk group "IP-B". With respect to switch 206 and following the direction indicated by the arrows, the first set of pathways 204 (e.g., the logical trunk group IP-A) is associated with an ingress call leg, and the second set of pathways (e.g., the logical trunk group IP-B) is associated with an egress call leg. In this example, the switch 206 associates call data with the logical trunk group IP-A because the call arrives from the data source 202. Similarly, the switch 206 associates call data with the logical trunk group IP-B because the call is being transmitted to the data destination 210.

The switch 206 operates in a packet-based environment (e.g., a packet-based network), so the data transmitted by the first set of pathways 204 is not required to correspond one-to-one to the data packets transmitted by the second set of pathways 208. More specifically, some members of the set of data packets can be transmitted by the second set of pathways 208, and some members can be transmitted over a third set of pathways (not shown). The data packets are reassembled at a remote switch (not shown) that is in communication with the final destination of the call. Data source 202 or destination 210 or both can be network node that includes one or more pieces of telephone equipment (e.g., the switch 206 or the gateway 110 of FIG. 1). The network node can include an interface with a packet-based network via the first or second sets of pathways 204, 208, or via a connection to network node rather than to individual telephony equipment within the node.

Figure 3:
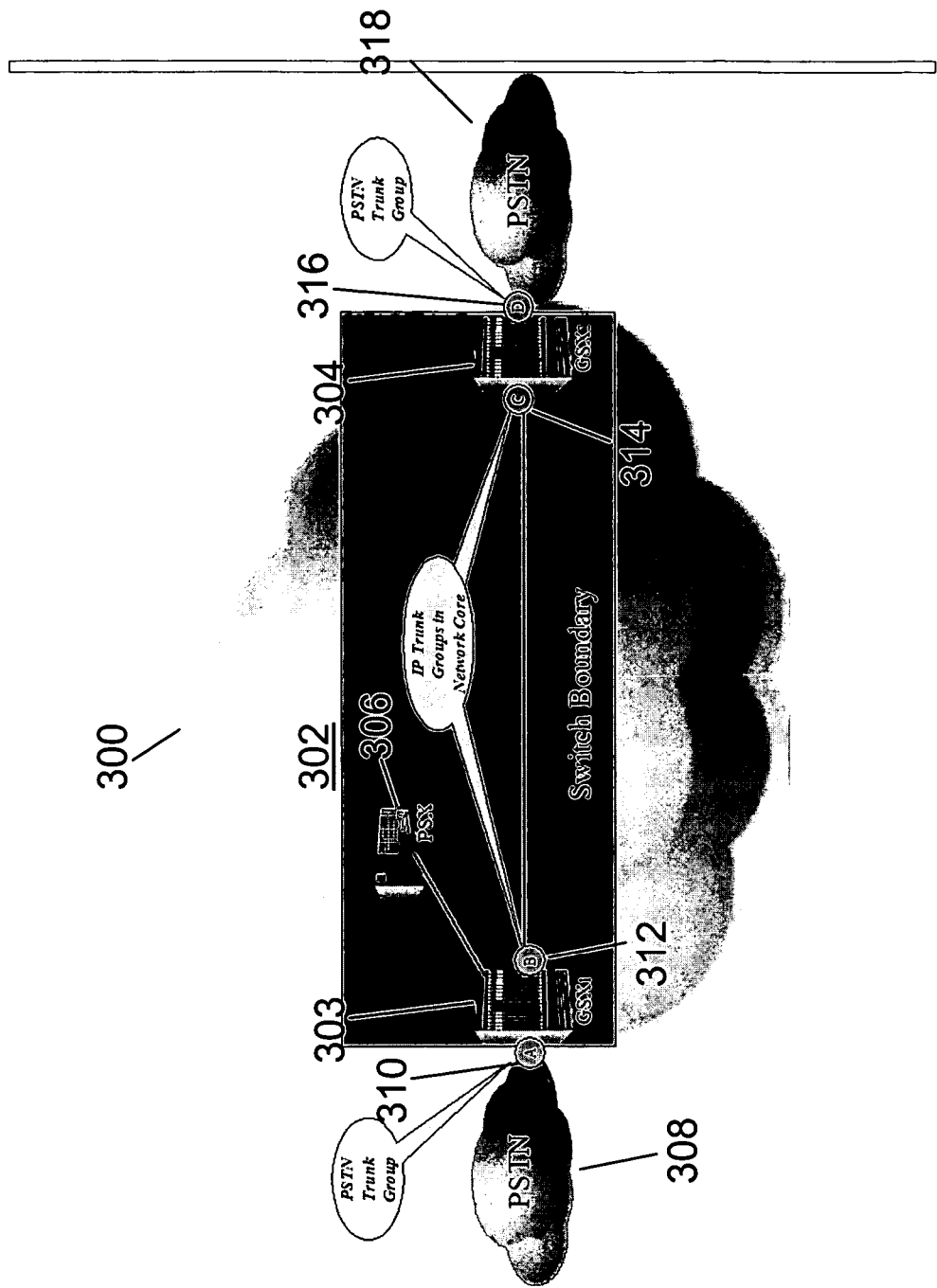

FIG. 3 shows a system 300 including exemplary networks and devices associated with data routing in a packet-based network core. In some embodiments, data associated with a call is routed through a packet-based network 302 in which substantially all of the network equipment is operated by a single entity or controller, for example a VOIP network administrator.

The network 302 includes a first switching component 303, a second switching component 304, and a control component 306. Switching components 303, 304 can be gateways as described above with respect to FIG. 1 (e.g., a GSX9000 sold by Sonus Networks of Chelmsford, Mass.) and control component 306 can be a policy server, controller, monitor, or other network component for storing and implementing control features. For example, the control component 306 can be a PSX policy server for use in the Insignus Softswitch™ architecture, both sold by Sonus Networks of Chelmsford Mass. In system 300, the switching components 303, 304 are "edge devices" (e.g., components that provide an entry point into the core network 302, such as that of a telephone carrier or internet service provider ("ISP")).

A first network 308 (e.g., a PSTN or a portion of the general PSTN) is in communication with switching component 303 via a first connection A 310 (e.g., a PSTN trunk group). In some embodiments, the first network 308 can be a packet-based network (e.g., an IP network), and the first connection A 310 can be a logical trunk group (e.g., an IP trunk group) without departing from the scope of the invention. In the illustrative example depicted in FIG. 3, the network 308 may also be referred to as PSTN 308, and the connection A 310 may also be referred to as PSTN connection A 310.

The first PSTN connection A 310 can be a PSTN trunk group that is in communication with switching component 303 (e.g., over wire, fiber optic cable, or other data transmission media). Data associated with a telephone call can originate from a caller in the PSTN 308 and is transmitted to the first switching component 303 for routing through the network 302 by the first PSTN connection A 310. Switching component 303 can communicate with other network equipment (e.g., switching component 304) via one or more sets of pathways that are associated with a logical trunk group B 312.

Switching component 303 communicates data packets associated with the call to the switching component 304 via a set of pathways associated with the logical trunk group B 312. Data packets are received by switching component 304 via the set of pathways between the components 303 and 304 and the switching component 304 associates this data with a logical trunk group C 314. As discussed above with respect to FIG. 2, the data packets transmitted over the first set of pathways 312 may not directly correspond to the data packets received over the second set of pathways 314. More particularly, the same set of pathways can have a different name with respect to different components. For example in system 300, the set of pathways between the components 303 and 304 are associated with the egress logical trunk group B 312 with respect to one component (e.g., the switching component 303) and associated with the ingress logical trunk group C 314 with respect to another component (e.g., the switching component 304).

In some embodiments, the first set of pathways (e.g., the set of pathways actually taken for the data traveling from the component 303 to the component 304) does not correspond directly (e.g., hop for hop through the packet-based network 302) with the second set of pathways (e.g., the set of pathways actually taken by the data going from the component 304 to the component 303). The set of data packets associated with the original call received by the component 304 is reassembled into a signal by a packet assembler/disassembler that can be co-located with switching component 304. A second connection D 316 (e.g., a PSTN trunk group) transmits the reassembled data from switching component 304 to a second network 318 (e.g., a PSTN network or a portion of the general PSTN) for further processing or communication to the intended call recipient.

In some embodiments, the second network 318 can be a packet-based network (e.g., an IP network), and the second connection D 316 can be a logical trunk group (e.g., an IP trunk group) without departing from the scope of the invention. In the illustrative example depicted in FIG. 3, the network 318 may also be referred to as the PSTN 318, and the connection D 316 may also be referred to as PSTN connection D 316.

From the point of view of the PSTNs 308, 318, the network 302 can appear as a single distributed switch. In some embodiments, the control component 306 provides routing instructions to switching component 303 based on the characteristic of the data source (e.g., the PSTN 308 or the first PSTN connection A 310) or the data destination (e.g., the switching component 304, the second PSTN connection D 316, or the PSTN 318), where the characteristic includes name, signaling protocol, TSAP, IP address or any combination of these. More particularly, the control component 306 indicates to the switching component 303 routing data (e.g., the IP address of the component 304) to employ for transmitting data through the core network 302 based in part on the characteristic. In some embodiments, data associated with a call is received by the switching component 303 over the PSTN connection 310, and the switching component 303 transmits a signal (e.g., a policy request) to the control component 306 indicating that the data was received or requesting routing or transmission instructions.

The control component 306 can provide to the switching component 303 routing information through the network 302 for the switching component 304 to ultimately transmit the data to the PSTN connection D 316—the control component 306 can provide routing information based on a characteristic associated with the data or a characteristic of a data source or destination. More particularly, the control component 306 provides routing information through the network 302 without knowledge of the particular topology of the network 302 by, for example, using the name of the logical trunk group with which a set of pathways is associated (e.g., logical trunk group B 312) to select the route based in part on, for example, the port (e.g., a DS0 or a DS1 port) on switching component 303 at which the data arrived from PSTN connection 310. Other characteristics can be used by control component 306 to select and provide routing information. From the point of view of the PSTNs 308, 318, the network 302 routes the data from the first PSTN connection A 310 to the second PSTN connection D 316.

For example, as a call is set up from PSTN connection A 310 to PSTN connection D 316 by the components 303 and 304, the components 303 and 304 associate the logical trunk groups B 312 and C 314 with the call. The component 303 associates the logical trunk group B 312 with the call as the call egresses the component 303. As the call ingresses the component 304, the component 304 associates the logical trunk group C 314 with the call. This procedure for associating a logical trunk group in the network core (e.g., the network 302) with a call is sometimes referred to as logical trunk group selection (or IP trunk group selection in the case where the core network is an IP-based network). In some embodiments, the control component 306 is employed in the logical trunk group selection. In some embodiments, information regarding the route through the network is available to the switching component 303 without communication to the control component 306 (e.g., the information can be stored on or available to the switching component 303).

In some embodiments, data associated with a call is processed by the network 302. The data can be processed by a call processor having an interface to the network 302 (e.g., a network card with an IP address). A call processor generally refers to a module for implementing functionality associated with call transmission through a network, for example, by providing signaling information, routing information, or implementing other functionalities with respect to data associated with a call such as compression or decompression or signal processing. In some embodiments a call processor can include the switching components 303, 304 and/or the control component 306 or other devices or modules not illustrated.

In some embodiments, data associated with a call includes information relating to the characteristic (e.g., information related to the characteristic forms part of a data packet). The characteristic can include a name, an IP address, a signaling protocol, a transport service access point, or any combination of these. The characteristic can be associated with a data source, a call processor, a set of pathways, a logical trunk group, or combinations of such elements.

In some embodiments, a selector selects a logical trunk group associated with a set of pathways over which a call processor (e.g., the switching component 303) can transmit the data based at least in part on the characteristic. The selector can be a module operable within the network 302. In some embodiments, the call processor (e.g., the switching component 303) includes the selector. In other embodiments, the selector is located remotely from a call processor (e.g., co-location with control component 306). A user can prioritize characteristics such that the selector considers first the highest-priority characteristic for routing (e.g., name) and then considers a second-highest-priority characteristic (e.g., IP address) only if routing is not possible using the highest-priority characteristic. In some embodiments, a default logical trunk group associated with a default set of pathways is available for selection by the selector if the lowest-priority set is unavailable.

By way of example, using the name of a data source as the characteristic, data associated with a route ("route data") is provided to the selector, such that the route data can be used to associate the call data (e.g., the packets associated with the call) with a logical trunk group (e.g., the logical trunk group B 312 or the logical trunk group C 314) representing a set of pathways through the packet network 302. The logical trunk group associated with the route can be denoted with a name (e.g., "Logical Trunk Group B 312" or "Logical Trunk Group C 314"). In one embodiment, a telephony device with a network interface (e.g., switching component 303), can be configured to transmit the data through the network based on the name of the associated logical trunk group (e.g., the logical trunk group B 312) or the destination of the route (e.g., the second PSTN connection D 316). In such an embodiment, the route through the network 302 is chosen by the selector based on the name of the logical trunk group, which allows an administrator to control the route or pathways of data transfer in a manner similar to that employed by an administrator with respect to PSTN trunk groups. An exemplary configuration of route data is depicted in Table 1 below:

TABLE 1

| | Route Data | | | | |
|---|---|---|---|---|---|
| Route Entry | Data Destination | Destination IP Address | Destination Trunk Group | Route Signaling Protocol | Route Specific Data |
| 1 | Switching element 303 | 10.160.100.101 | Logical Trunk Group B 312 | — | * |
| 2 | Switching element 304 | 10.160.101.101 | Logical Trunk Group C 314 | SIP | * |
| 3 | Switching element (not shown) | 10.160.255.255 | Logical Trunk Group E (not shown) | SIP-T | * |

Referring to Table 1, the entries associated with "Route Entry 1" can correspond to switching component 303. More specifically, the entries can refer to transmitting data across switching component 303. "Data Destination" can correspond to the characteristic "name," and "Destination IP Address" can correspond to the characteristic "IP address." Switching element 303 can communicate with or transmit data associated with a call to the set of pathways associated with the logical trunk group B 312. "Route Signaling Protocol" identifies the signaling protocol used to communicate between switching elements (e.g., between switching element 303 and switching element 304). In some embodiments, "Route Signaling Protocol" refers to the signaling protocol associated with a set of pathways (e.g., the set of pathways associated with the logical trunk group B 312). "Route Signaling Protocol" can identify a physical location with respect to the network or call processors in communication with the network. For example, the null entry associated with Route Entry 1 indicates that the call is transmitted from one location on the switching component 303 to another location (e.g., the set of pathways associated with the logical trunk group B 312 or the TSAP associated with the set of pathways associated with the logical trunk group B 312)—the null entry is the signaling protocol associated with transmitting data within or across a switching component 303 and generally is not configured by an administrator.

The entries associated with "Route Entry 2" can correspond to switching component 304, e.g., the destination of the data after the call egresses switching component 303. The entry associated with "Destination Trunk Group" can refer to the logical trunk group associated with the egress call leg with respect to the switching component 303 (e.g., the logical trunk group B 314). The "Route Signaling Protocol" can indicate that the call is be transmitted to switching component 304 using SIP signaling protocol. More particularly, a network administrator can configure call routing based on the desired communication protocol to be used between two switching components. For example, the Route Signaling Protocol associated with Route Entry 3 is SIP-T. A network administrator could select the signaling protocol SIP-T and hence the route and logical trunk group that will handle the call. In some embodiments, SIP or SIP-T signaling protocol can indicate transmission to a switching component logically remote from switching component 303 but still operating within the network core (e.g., switching component 304). The signaling protocols of Table 1 are merely illustrative and other signaling protocols may be used, for example H.323.

In some embodiments, a "Route Signaling Protocol" entry that is not a null entry (e.g., an entry of SIP, SIP-T, or H.323)indicates, for example, data transmission to a call processor or switching component (not shown) logically remote from switching component 303 or operating outside the network 302 core. In some embodiments, the signaling protocol is an industry standard signaling protocol or proprietary signaling protocols between edge devices, such as a GW-GW protocol, which refers generally to the signaling protocol between two gateways.

In some embodiments, the characteristic that controls the logical trunk group chosen by the selector for associating the transmitted or received data is the IP address or signaling protocol associated with a set of pathways or with the call processor. In some embodiments, the characteristic is a VLAN. In general, network equipment (e.g., call processors or routers) can be grouped according to a packet-based network address (e.g., IP network address) associated with each respective processor. Such groupings can be assigned to a logical trunk group. The call processor can maintain a mapping of IP network addresses that are associated with the logical trunk groups. In some embodiments, the mapping is contained in an object or a table that is available to the call processor (e.g., Table 1). In a particular embodiment, a separate mapping is maintained for data that is received by a call processor (e.g., ingress call legs) and data that is transmitted by a call processor (e.g., egress call legs). In some embodiments, the characteristic that is associated with the logical trunk group (e.g., a name, IP address, signaling protocol, VLAN identifier, or a combination of these) is associated generally with a data source, a data destination or a trunk group. In some embodiments, the characteristic includes more than one type of characteristic from some combination of data sources, data destinations, or trunk groups.

When data associated with a call are processed by a call processor, a logical trunk group can be associated with or assigned to the call. More particularly, data associated with a call that is transmitted to switching component 303 from PSTN connection 310 can be associated with a first logical trunk group. For example, the ingress call leg established at the switching component 303 from the PSTN connection A 310 can be associated with a logical trunk group. As the switching component 303 processes the call, data associated with the call is associated with the logical trunk group B 312 based on the destination of the call. In such a configuration, the PSTN connection A 310 and the set of pathways associated with the logical trunk group B 312 are each in communication with the call processor (e.g., switching component 303). An egress call leg is associated with the logical trunk group B 312.

In some embodiments, the logical trunk group B 312 is selected based on the source of the call (e.g., the PSTN 308 or PSTN connection A 310) or, the signaling protocol in which the signaling data associated with the call was received (e.g., SS7).

In some embodiments, each route through the packet-based network includes route specific data associated with the logical trunk group chosen by the call processor to associate with the transmitted or received call data. The route specific data can include a list of peer-signaling addresses, peer-signaling protocol, other configuration data that can be used to determine characteristics of a particular call. Some specific examples of the specific data include the codec (e.g., compression/decompression standard used to assemble the packet), diffserve code point, packet size, codec options (e.g., silence suppression), fax/modem/data call handling, and DTMF tone handling. The specific data can include data associated with signaling to determine the content of signaling messages and the sequence or order of signaling messages. The route specific data can be invoked or accessed by a switching component (e.g., the switching component 303) to provide insight into the behavior (e.g., the signaling behavior) associated with a particular signaling peer. The route specific data can be associated with network equipment that forms at least a part of the set of pathways associated with that logical trunk group.

In still other embodiments, the logical trunk group is selected based in part on the IP network to be traversed by the set of pathways. In such an embodiment, the selector (also referred to herein as an IP network selector) selects the IP network to transmit the data instead of or in addition to selecting the set of pathways through that network. The selector, in effect, selects a set of pathways, and thus the associated logical trunk group, by selecting the IP network. For example, the selector implicitly selects the logical trunk groups associated with the sets of pathways associated with or passing through network 302 (e.g., the logical trunk group B 312 and the logical trunk group C 314) by routing calls to the switching component 303. An exemplary embodiment of a table for selecting an IP network or logical trunk groups associated with that network is depicted in Table 2.

TABLE 2

Ingress IP Trunk Group Selection Table

| | IP Network Selector | | Signaling | |
|---|---|---|---|---|
| Entry | Network Number | Network Mask | Protocol Selector | Logical trunk group |
| 1 | 209.131.0.0 | 255.255.0.0 | SIP-T | FROM_LA |
| 2 | 209.131.16.0 | 255.255.240.0 | SIP-T | FROM_MA |
| 3 | 171.1.0.0 | 255.255.0.0 | SIP | FROM_UK |
| 4 | 172.4.0.0 | 255.255.0.0 | SIP | FROM_UK |

Entry 1 of Table 2 represents a range of IP host addresses from 209.131.0.0 to 209.131.255.255, and Entry 2 represents the range of IP host addresses from 209.131.16.0 to 209.131.31.255. In such an embodiment, both Entry 1 and Entry 2 indicate that SIP-T signaling protocol is being used (e.g., for data transmissions within a network core). Entry 1 of Table 2 is associated with a logical trunk group named FROM_LA, and Entry 2 is associated with a logical trunk group named FROM_MA.

As depicted, the range of host addresses defined by Entry 2 is defined within the range specified by Entry 1 (e.g., the range specified by Entry 2 is a subset of the range specified by Entry 1). In some embodiments, the characteristic that is used to select a logical trunk group is an IP address. Data arriving from a call processor having an IP address of, for example, 209.131.17.43 and employing SIP protocol matches both Entry 1 and Entry 2 of Table 2. In such an example, Entry 2 provides a more specific match as a subset of the range of IP addresses of Entry 1, and thus, Entry 2 is selected as an egress call leg (e.g., by a selector). Thus the associated logical trunk group with which the data is associated for that call is the logical trunk group named "FROM_MA".

The selector can look up Table 2 and determine that Entry 2 is a more specific address match when the characteristic is an IP address. The selector can then provide information about Entry 2 to a call processor (e.g., the switching component 303) that egresses the call over the network over the set of pathways associated with the logical trunk group named FROM_MA in part in response to the information returned by the selector. The information returned by the selector after consultation with Table 2 can change as the characteristic changes, for example, in response to a user-provided input or configuration. For example, Table 2 includes characteristics associated with a name of a logical trunk group (e.g., FROM_UK), a signaling protocol associated with a set of pathways associated with that trunk group (e.g., SIP), an IP address associated with a set of pathways associated with that trunk group (e.g., 172.4.0.0), or a combination of these characteristics. Any of the characteristics of Table 2 can be used by the selector for determining which set of pathways over which to transmit the data and thus the logical trunk group with which to associate the data.

In some embodiments, the list of IP networks available to the IP network selector is not contiguous. For example, Entry 2 and Entry 3 in Table 2 represent two non-contiguous IP networks, as illustrated by the "Network Number" associated with each entry. As depicted, Entry 2 is associated with a network located in the United States, and Entry 3 is associated with a network located in the United Kingdom. Such a configuration can provide flexibility in the network design to aggregate a number of networks, represented by a range of host IP addresses, into one configuration element or object (e.g., Table 2) at the application level and for promoting network growth.

As the size of a network or node expands beyond the capabilities of a specified range of host IP addresses, additional ranges of IP addresses can be added to represent the same set of pathways and thus are associated with the same logical trunk group. By way of nonlimiting example, a second packet-based network 172.4.0.0/16 can be added to the network associated with a set of pathways originating from the United Kingdom. In such an example, both 171.1.0.0/16 and 172.4.0.0/16 are associated with the logical trunk group named FROM_UK.

In some embodiments, the IP network address associated with an IP network or set of pathways through the IP network can include an IP network number and an IP network mask. Such a configuration allows transparent communication between the network in which the data originates (e.g., the PSTN 308) and the network over which data is transmitted (e.g., network 302) because data is transmitted to a call processor having an IP address (e.g., a network card with an IP address) associated with the network mask (e.g., IP address 255.255.0.0 of Entry 1 of Table 2). The IP address of the network that actually transmits the data (e.g., IP address 209.131.0.0 of Entry 1 of Table 2) can change without requiring reconfiguration of Table 2 or the PSTN connection 310. More particularly, the IP address associated with Entry 1 can be changed (e.g., by replacing the network card of the switching component 303 or the switching component 303 itself) without affecting the address to which the PSTN 308 transmits the data.

A logical trunk group can be associated with the IP network and can include a characteristic as described above. In some embodiments, the logical trunk group is chosen using the longest prefix match algorithm (e.g., the most specific entry from, for example Table 2, is chosen). In other embodiments, different methods for selecting an IP network can be employed to arrive at the association with a logical trunk group.

In an advantageous configuration, the architecture described with respect to selecting a logical trunk group associated with a set of pathways through the IP network (e.g., network 302) is scaleable. For example, each logical trunk group (e.g., the logical trunk group B 312 and the logical trunk group C 314) can be configured by using an IP network selector rather than a particular set of nearest neighbors (e.g., a particular topology). An IP network selector generally selects a network node (e.g., the data source 202 of FIG. 2) rather than an individual gateway, switch or call processor (e.g., switching component 304) for connecting and transmitting data associated with a call . . . More specifically, network equipment that can be added to a particular network node is automatically associated with that network node when the network node is selected for data transmission by the IP network selector. Because the network node is selected for data transmission rather than individual network equipment or sets of pathways, the selector does not require knowledge of the network node's topology or composition. More particularly, a logical trunk group is selected when the network node is selected to transmit data associated with a call, even if a particular set of pathways or piece of network equipment associated with the set of pathways was added to the network node after the creation of the object (e.g., Table 2).

Figure 4:
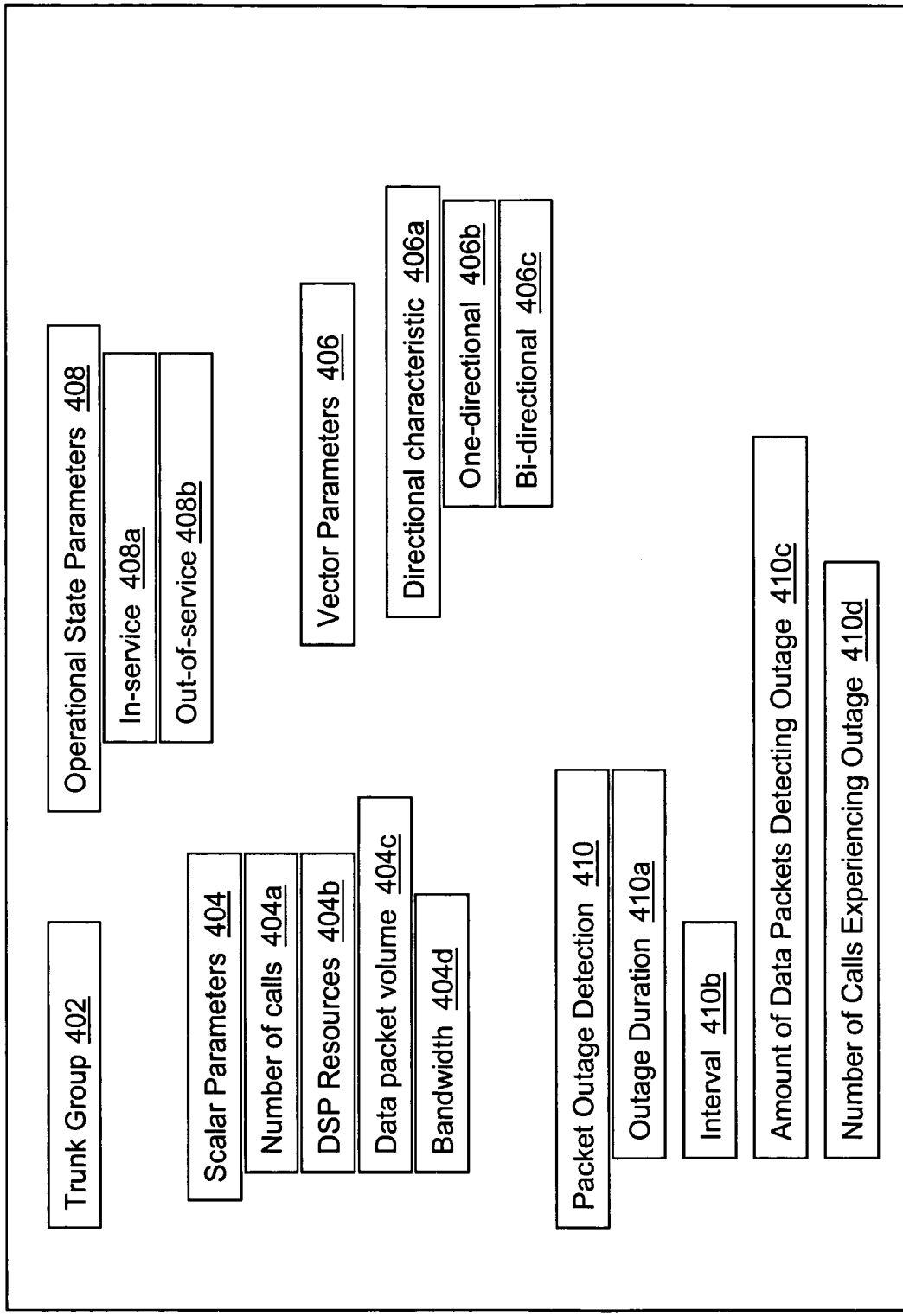
FIG. 4 is an exemplary graphical user interface for configuring control features.

FIG. 4 illustrates an exemplary graphical user interface for implementing control features in a packet-based network. The graphical user interface ("GUI") 400 includes a plurality of fields associated with resource parameters for controlling data in an IP network, particularly data packets associated with a logical trunk group through an IP network (e.g., set of pathways associated with the logical trunk group B 312 of FIG. 3). The GUI 400 can be displayed on a display means (e.g., a computer monitor) in communication with elements of an IP network (e.g., switching component 303 or control component 306). In some embodiments, a module is adapted to generate the GUI 400. The GUI 400 allows a user to determine or control various configurable variables in connection with a logical trunk group (e.g., displayed in the GUI 400 as field 402). The configurable variable is associated with a control feature or resource parameter that is associated with a logical trunk group. In some embodiments, the appearance of the GUI 400 differs depending on the value of the field 402. Additionally, the values of the resource parameters (e.g., the with fields 404, 406, 408, and 410 and the sub-fields associated with those fields 404, 406, 408, 410) In other embodiments, field 402 can refer to a group of logical trunk groups or a combination of groups as discussed below with respect to FIGS. 7 and 8.

The resource parameter can include scalar quantities (e.g., bandwidth capacity, call capacity, signal processing speed, or data packet volume of the field 404), vector quantities (e.g., a directional characteristic of field 406), or an operational state or toggle-like quantity (e.g., in-service or out-of-service operational states of field 408), or a combination of any of these. In other embodiments, more than one user interface can be used to implement control functions. Exemplary resource parameters and control features will be described with reference to the exemplary networks and devices depicted in FIG. 3, but the resource parameters and control features can be implemented with respect to other networks or devices (e.g., the exemplary configuration of FIG. 1 or 2 or other configurations).

The illustrated scalar parameters involving configurable variables include fields for number of calls 404a, DSP resources 404b, data packet volume 404c, bandwidth 404d, or other resources (not shown) associated with a signaling peer. The scalar parameters can be configured by inputting a data value into the sub-field or through, for example a drop-down menu. When data associated with a call exceed any of the configured resource parameters, a trigger event occurs (e.g., the data packets are not transmitted over the set of pathways associated with logical trunk group with which the trigger event is associated). In some embodiments, a particular call or call session can be more "expensive" in terms of scalar parameters required to guarantee a minimum quality of service. An administrator can configure the scalar parameters to limit the scalar parameters that are used for each call, which allows the administrator to limit the number of calls from a particular signaling peer (e.g., switching component 303 of FIG. 3).

Vector parameters can include a directional characteristic 406a such as, for example, a "one-directional" characteristic 406b or a "bidirectional" characteristic 406c. In some embodiments, the vector parameters 406 can be configured by check-off boxes. Other, more complicated arrangements of vector parameters will be appreciated. For example, the directional characteristic 406 can be configured to allow bi-directional call traffic (e.g., by enabling bi-directional characteristic 406c). The administrator can configure the directional characteristic 406a to allocate a certain amount of resources for calls in a first direction (e.g., incoming calls) and a certain, not necessarily equal, amount of resources for calls in a second direction (e.g., outgoing calls).

Another field 408 involves the operational state associated with a logical trunk group (e.g., "in-service" 408a or "out-of-service" 408b) that allows a user to control whether the particular set of pathways associated with the logical trunk group indicated in field 402 is accessible. In some embodiments, a logical trunk group can be in-service for calls in one direction and out-of-service for calls in the other direction. The packet outage detection field 410 permits a user to determine or define whether a trigger event occurs with respect to the state of a set of data packets in the set of pathways associated with a particular logical trunk group. More particularly, the packet outage detection field 410 allows the user to determine or define parameters associated with various states of sets of data packets (e.g., a transmitted, received, lost, or queued state).

In some embodiments, a logical trunk group (e.g., the logical trunk group B 312) includes a vector parameter 406 or directional characteristic 406a. The directional characteristic 406a can refer to the direction of a call leg with respect to a particular switching component (e.g., the switching component 303). In some embodiments, ingress call legs are referred to as "inbound" calls and egress call legs are referred to as "outbound" calls. The two endpoints can include gateways, call processors, data sources, switching components, or other network equipment (e.g., between the switching components 303, 304 or, more generally, between the PSTN 308 and the PSTN 318). In some embodiments, the endpoints include a monitor or controller (e.g., the control component 306) and a switching component (e.g., the switching component 303) that can apply access control to data packets associated with the logical trunk group (e.g., the logical trunk group B 312). One advantage achieved by this embodiment includes preventing further congestion of data traffic downstream of the switching component.

In embodiments involving an operational state or toggle-like resource parameter 408, a "one-way" directional characteristic 408a includes "inbound" or "outbound." For example, a logical trunk group having the "inbound" associated directional characteristic can have control measures imposed (e.g., resource limitations) on the data packets received at a call processor (e.g., the switching component 303). The controller does not allow data packets associated with an egress (e.g., outbound) call leg to access a set of pathways associated with that logical trunk group- only data packets associated with ingress call legs are allowed to potentially access the set of pathways. Moreover, data associated with an ingress call leg can gain access to a set of pathways associated with the logical trunk group if the set includes sufficient resources to process the call (e.g., non-congested data traffic). A directional characteristic can impose a control in addition to scalar parameters described above. In other embodiments, a vector characteristic can be imposed on a set of pathways associated with a logical trunk group without a scalar quantity for the resource parameter.

In embodiments employing a two-way directional characteristic 408b, a resource parameter can be shared by incoming call traffic and outgoing call traffic associated with the same logical trunk group, or each logical trunk group can include its own resource parameter. Data packets and/or calls are permitted access to the set of pathways associated with a logical trunk group provided the logical trunk group has sufficient resources available to transmit the packets (e.g., the data packet resource requirements do not exceed the resource parameter associated with the logical trunk group). More particularly, a call can be connected across a given IP network (e.g., the logical trunk group is selected based on whether the call is an incoming call or an outgoing call with respect to a particular switching component.

Another advantage of a two-way directional characteristic involves resource reservation. In some embodiments, when data packets (e.g., associated with a call) ingress a call processor (e.g., the switching component 303) and are then transmitted over a set of pathways associated with an IP trunk group having a two-way directional characteristic, a resource parameter (e.g., a scalar quantity such as number of calls or a vector parameter such as a directional characteristic) can be reserved for unrelated outgoing calls. In this way, resources can reserved for outgoing calls from a particular switching component to ensure that, for example, an increased number of incoming calls does not consume all of the resources of the switching component. Such a configuration can provide a quality of service assurance because an increase in data traffic associated with that logical trunk group does not affect the resources already reserved, which can be "shielded" from the increased traffic to prevent a call from being disconnected or dropped. In the telephony field, such a configuration reduces loss of data packets associated with an increase in call traffic over a data link associated with that logical trunk group (e.g., the set of pathways associated with the logical trunk group B 312).

In another advantageous configuration, a logical trunk group can include an operational state parameter 408 such as "in-service" 408a or "out-of-service" 408b. The operational state parameter 408 can be controlled by a central user, e.g., a network administrator, to add or remove available pathways associated with the logical trunk group for data transmission. In some embodiments, the user changes the operational state parameter 408 of a logical trunk group during an existing call session. The change to the operational state parameter does not affect existing call sessions, only future call sessions.

An operational state parameter 408 can add a level of control (in addition to scalar parameters 404 or vector parameters 406) to a set of pathways associated with a logical trunk group. For example, a logical trunk group associated with the out-of-service operational state 408b is not available for handling call sessions (e.g., data packets associated with a call are not able to access that set of pathways associated with the logical trunk group, regardless of the scalar parameters 404 or vector parameters 406 associated with that logical trunk group).

In general, resource parameters and access to a set of pathways associated with a logical trunk group can be controlled either statically or dynamically. The process of implementing control features can be referred to as "enforcing limits," "applying controls," "implementing control features," or "comparing data to resource parameters" with respect to a logical trunk group. Other expressions for implementing control features with respect to data traffic can be used. In a statically controlled situation, the state of the data packets with respect to a logical trunk group can be monitored. A monitor module can provide the monitoring of the state associated with the data packets. In an illustrative embodiment, when the state is lost or queued, the monitor provides information about the state to the selector. The selector in turn can select a set of pathways associated with a logical trunk group that is not associated with a lost or queued state (e.g., associated with a transmitted or received state) to transmit the additional data packets. For example, on call setup, the monitor can also observe and monitor data requirements associated with the data packets and compare those requirements with the resource parameter associated with the logical trunk group. If the data requirements exceed the resource parameter, the data can be rerouted, and the process is iterated until a logical trunk group (and its associated set of pathways) is found that can transmit the data packets.

In other embodiments, dynamic control features are implemented with respect to data attempting to access a set of pathways associated with a particular logical trunk group. In such an embodiment, a monitor module provides monitoring of a state associated with a set of data packets. When the state is lost or queued, the monitor can provide information about the state to the selector or a controller. The controller (e.g., a user or control component 306) can adjust or configure the resource parameter associated with the logical trunk group, which in turn can allow a second set of data packets to be transmitted by the set of pathways associated with the logical trunk group. More particularly, the controller can increase the value of a scalar parameter 404 or change the value of the vector parameter 406 (e.g., from a "one-way" 406a directional characteristic to a "two-way" 406b directional characteristic) or the operational state parameter 408 (e.g., from an "out-of-service" 408b operational state to an "in-service" 408a operational state).

In some embodiments, a set of pathways associated with a logical trunk group can be selected regardless of the state associated with data packets associated with that logical trunk group. More particularly, the set of pathways selected to transmit data associated with a call can be the set of pathways associated with a logical trunk group without optimal resource capacity. In some embodiments, the size of the set of data packets associated with a logical trunk group increases until a lost state arises (e.g., some packets in the set are not transmitted across the set of pathways associated with that logical trunk group as determined by the packet data received at a downstream call processor), at which point the selector no longer routes data packets to the set of pathways associated with that logical trunk group. In addition to limiting or selecting a set of pathways based on a state of the logical trunk group, the selection can be based in part on delay or jitter (e.g., variations in delay) measurements associated with a logical trunk group.

In a particular embodiment, controlling access dynamically can be accomplished by three cooperating algorithms implemented at three layers of operation in the controller: a set layer, a pathway layer, and a data admission layer. The algorithm for the set layer determines a state, also called a congestion state, for the logical trunk group that can be communicated to the selector, controller, or the pathway layer (e.g., control component 306). The algorithm for the pathway layer determines the resource capacity of the logical trunk group (e.g., by determining the resource capacities of each pathway that is a member of the set of pathways associated with that logical trunk group). The congestion state as determined by the set layer provides an input for the pathway layer algorithm. A capacity associated with a resource parameter of a logical trunk group can be an output. The output of the pathway layer (e.g., resources available with respect to a given set of pathways associated with the logical trunk group) can be an input to the data admission layer algorithm. For example, the data admission layer can compare the number of calls 404a (e.g., the input from the pathway layer and the configurable resource parameter of the GUI 400 related to number of calls 404a) to a maximum number of calls for reliable transmission. If the number of calls being processed by the logical trunk group exceeds the configurable variable 404a, the data admission layer requests additional resources (e.g., an increased maximum number of calls) for that logical trunk group. A call processor or media gateway (e.g., the switching component 110 of FIG. 1) can implement three cooperating algorithms associated with dynamic access control. Dynamic resource allocation at the gateway or switch level permits decentralized resource management and reduces processing demands on a centralized resource manager (e.g., control component 306 of FIG. 3).

Advantageously, dynamic resource allocation permits call traffic-level control. A monitor module monitors the quality and performance of call traffic (e.g., various parameters) through a packet network at the packet level (e.g., by monitoring lost packets, jitter, or delay) and can extrapolate or aggregate the quality and performance to the call or logical trunk group level. When the parameters associated with network quality and performance fall below a threshold level, the monitor module can invoke a trigger action to prevent additional calls from being associated with the particular logical trunk group that is experiencing reduced quality or performance.

A network administrator can adjust call admission policies associated with the logical trunk groups in response to the trigger action or various other performance statistics. A specific implementation of traffic-level control includes a packet outage detection ("POD") algorithm associated with various trigger events. In some embodiments, the POD algorithm is implemented for use with a logical trunk group, particularly by digital signal processors associated with the logical trunk group. A flag associated with the state can be transmitted with the data packets for receiving with the transmission. The flag can indicate the size of the packet outage (e.g., the ratio of "lost" or "queued" packets to "transmitted" or "received" packets) or location in the set of data packets that the outage occurred.

In some embodiments, the packet outage is determined from the ratio of received packets to transmitted packets, or other combinations of states. In other embodiments, the state is detected by network equipment such as switching elements or gateways (e.g., switching component 303 or 304). In still other embodiments, real-time control protocol (also known as "RTCP") statistics or implementations can detect the state.

Various trigger events can prompt a packet outage alert to be associated with a logical trunk group. A user can adjust a resource parameter (e.g., on the GUI 400) to respond to the alert. For example, an administrator can operationally remove a logical trunk group from service or can adjust the trunk group's resource allocation in response to the outage alert.

In some embodiments, trigger events can be manually configured by a user to allow some control over network performance (e.g., by configuring the packet outage detection fields 410a-d). More particularly, a user-provided configuration can define the trigger event. For example, the user can provide certain minimum or maximum parameters, or default parameters can be used. The user-provided configuration can be referred to as a configurable variable. Trigger events or configurable variables can include the following: packet outage minimum duration 410a, outage detection intervals 410b, amount of data detecting packet outage 410c, minimum number of calls 410d, or a combination of any of these.

With respect to packet outage minimum duration 410a, the configurable variable can allow an administrator to specify criteria for adding a flag to the set of data packets (e.g., by inputting a value associated with the criteria into the GUI 400, associated with packet outage detection). A sustained packet outage can be detrimental to call quality and can indicate a failure condition somewhere in the packet-based network (e.g., some piece or pieces of network equipment associated with the set of pathways associated with the logical trunk group). In some embodiments, a burst loss of packets can perceptibly affect the quality of a phone call but without significant effect on the end-users (e.g., the call participants). A momentary loss of packets can be considered "normal"; for example, temporary router congestion can result in momentary loss of packets without disconnecting the call.

One advantageous feature of packet outage minimum duration can allow the administrator (e.g., the user providing the configuration to control component 306 via the GUI 400) to customize the trigger to match the conditions of a particular packet-based network. In some embodiments, the minimum packet outage duration 410a is configurable in units of milliseconds, but any suitable interval is contemplated.

Some embodiments involve a configurable outage detection interval variable 410b. In such a configuration, a user or an administrator can ignore the state of a set of data packets for data that older in time than a specified time value. One advantageous feature of this configuration allows the administrator to address transient fault conditions. Packet outage events can be cumulated within a time interval. The detection algorithm can be based on the sum of all of the packet outages that occurred during the interval. The time interval could further be divided into, for example, three sub-intervals. In some embodiments, the packet outage detection interval is specified in seconds, but any suitable interval is contemplated.

With respect to the amount of data packets detecting packet outage 410c and the minimum number of calls detecting packet outage 410d, the configurable variable can allow a user or an administrator to specify when to trigger a flag based on the effect of packet outage on the rest of the network (e.g., switching component 314, the second PSTN 318 or the call recipient). For example, if packet outage is detected in a small number of calls (e.g., less than the number specified by the configurable variable 410c, 410d in the GUI 400), the flag is not triggered. Conversely, if the packet outage is detected in a large number of calls (e.g., more than or equal to the number specified by the variable 410c, 410d), the flag can be triggered. The configurable variable can be defined, for example, as a number of calls or as a percentage of calls processed that are associated with a logical trunk group (e.g., the calls processed having data that travel through the logical trunk group B 312).

Another advantageous feature involves traffic monitoring with sets of data packets providing the traffic. Traffic data can be measured and made available to call processors for more effective transmission. Additionally, traffic data can be displayed on the GUI 400 and available to a user. In some embodiments, the traffic data can be communicated to a resource manager (e.g., a controller such as control component 306) or to various gateways (e.g., switching components 303, 304). The data can be reformulated, manipulated, or calculated into statistics, or it can be stored and archived without processing. In some embodiments, the traffic data can be used by a network management system (e.g., control component 306) to facilitate call routing, data transmission, or data traffic engineering.

When the data is available to a user (e.g., via the GUI 400), the user can view and understand how various network equipment performs or is performing with respect to call processing. The user can then adjust or manipulate configurable variables and parameters 402, 404, 406, 408, 410 fields of the GUI 400 to improve network performance in part in response to problems that are perceived or observed with respect to the network. For example, data associated with a call can be used to assemble call performance statistics with respect to a particular logical trunk group (e.g., the logical trunk group B 312), and thus give a user an insight into the performance of the packet network (e.g., the set of pathways through the network 302 associated with the logical trunk group B 312, even if there is no direct knowledge of the topology of the packet network 302).

The statistics of multiple logical trunk groups can also give the user additional insights to the packet network when the overall topology is not known. Using system 100 in an example where the trunk group TG-A 160 is associated with the gateway 140 and the logical trunk group TG-B 165 is associated with the gateway 145 can provide insight into the network 120. If the call performance statistics indicate that call quality is degrading with respect to calls between the gateways 110 and 140 but do not indicate that call quality is degrading with respect to calls between the gateways 110 and 145, then the problem lies in pathways only specific to the gateway 140. If, however, call quality is degrading for both connections, then the problem lies in a pathway common to both or possibly in the packet network 120. The performance statistics can be observed or adjusted by a user or utilized by call processors (e.g., switching component 303).

Multiple user inputs can be used to configure parameters using the GUI 400. Examples of such inputs include buttons, radio buttons, icons, check boxes, combo boxes, menus, text boxes, tooltips, toggle switches, buttons, scroll bars, toolbars, status bars, windows, or other suitable icons or widgets associated with a GUI 400. In other embodiments, the network management system adjusts the control features without requiring the input of a user. It is worth noting that for controlling quality of PSTN calls and managing a PSTN, the Telcordia GR-477 standard on network traffic management deals with PSTN trunk group reservation and PSTN trunk group controls. Through the use of logical trunk groups, the control variables and performance statistics collected can mirror those used in the PSTN, for example, those defined by the GR-477 standard, to provide analogous management of calls going through packet-based networks.

Figure 5:
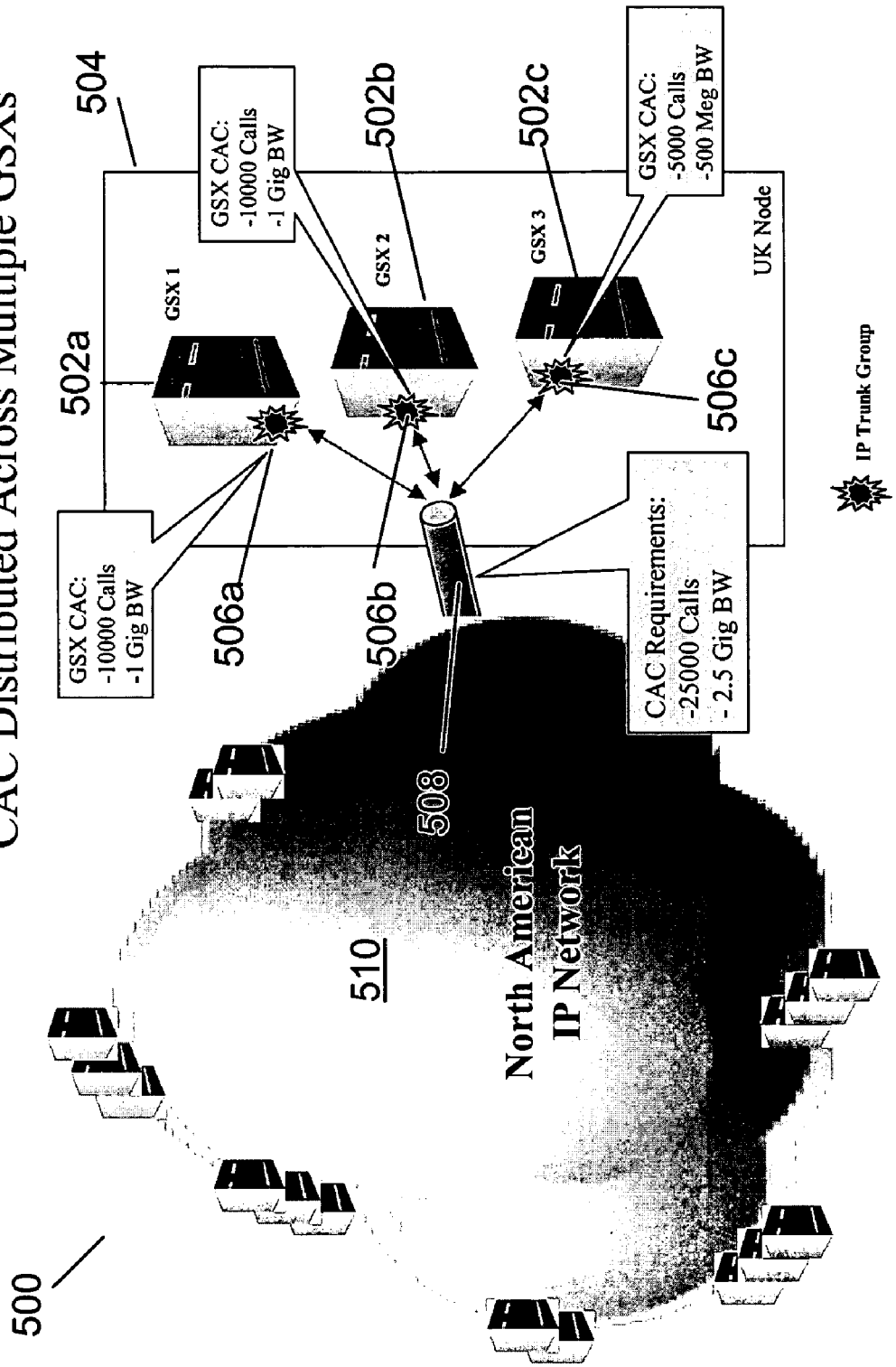
FIGS. 5-6 depict exemplary networks and devices involved with distributed control features.

Referring now to FIG. 5, a block diagram of a system 500 including exemplary networks and devices associated with distributed control features associated with access to sets of pathways associated with logical trunk groups is depicted. The exemplary configuration of the system 500 includes several call processors 502a-c, which combine to form a logical network node 504. Each call processor 502*a-c* has a defined logical trunk group 506*a-c*, respectively that is associated with call data transmitted through a packet-based communication channel 508. As discussed above, each call processor 502*a-c* or logical trunk group 506*a-c* can be associated with call admissions controls. The admissions controls of each component are combined to form an aggregated admissions control for the combined communications channel 508 for the node 504. The admissions controls are not required to be equally distributed; more particularly, each individual component (e.g., the call processors 502*a-c*, the logical trunk groups 506*a-c*, or combinations of them) can be associated with an individual set of admissions controls. In some embodiments, other types of data sources are in communication with the logical trunk groups 506*a-c*.

In some embodiments, the combined communications channel 508 is associated with a resource parameter or limitation, and the parameter or limitation is distributed to the call processors 502*a-c*. In this way, resource parameters of the communications channel 508 can be determined either by the combining resource parameters associated with the individual call processors 502*a-c* or trunk groups 506*a-c* or by a centralized configuration, e.g., by an administrator (not shown). The resource parameter associated with the channel 508 can include additional features or different resource parameters than the result of combining the parameters or features of the call processors 502*a-c* or trunk groups 506*a-c*.

In some embodiments, resources or parameters can be enhanced by allowing crank-back. Crank-back can involve selecting a new logical trunk group (e.g., the logical trunk group 506*b*) when admission to a selected trunk group (e.g., the logical trunk group 506*a*) fails. Call admission fails when data associated with a call setup cannot be reliably transmitted over the set of pathways associated with the selected trunk group (e.g., the logical trunk group 506*a*). The control channel 508 can include the logical trunk groups 506*a-c* associated with the node 504, and can interface with a remote packet-based network 510. The packet-based network 510 can be physically and logically remote from the packet-based network (not shown) that includes the logical trunk groups 506*a-c* (e.g., the communications channel 508 communicates with a component having an interface to the packet-based network 510). In some embodiments, the communications channel 508 is referred to as a group.

Figure 6:
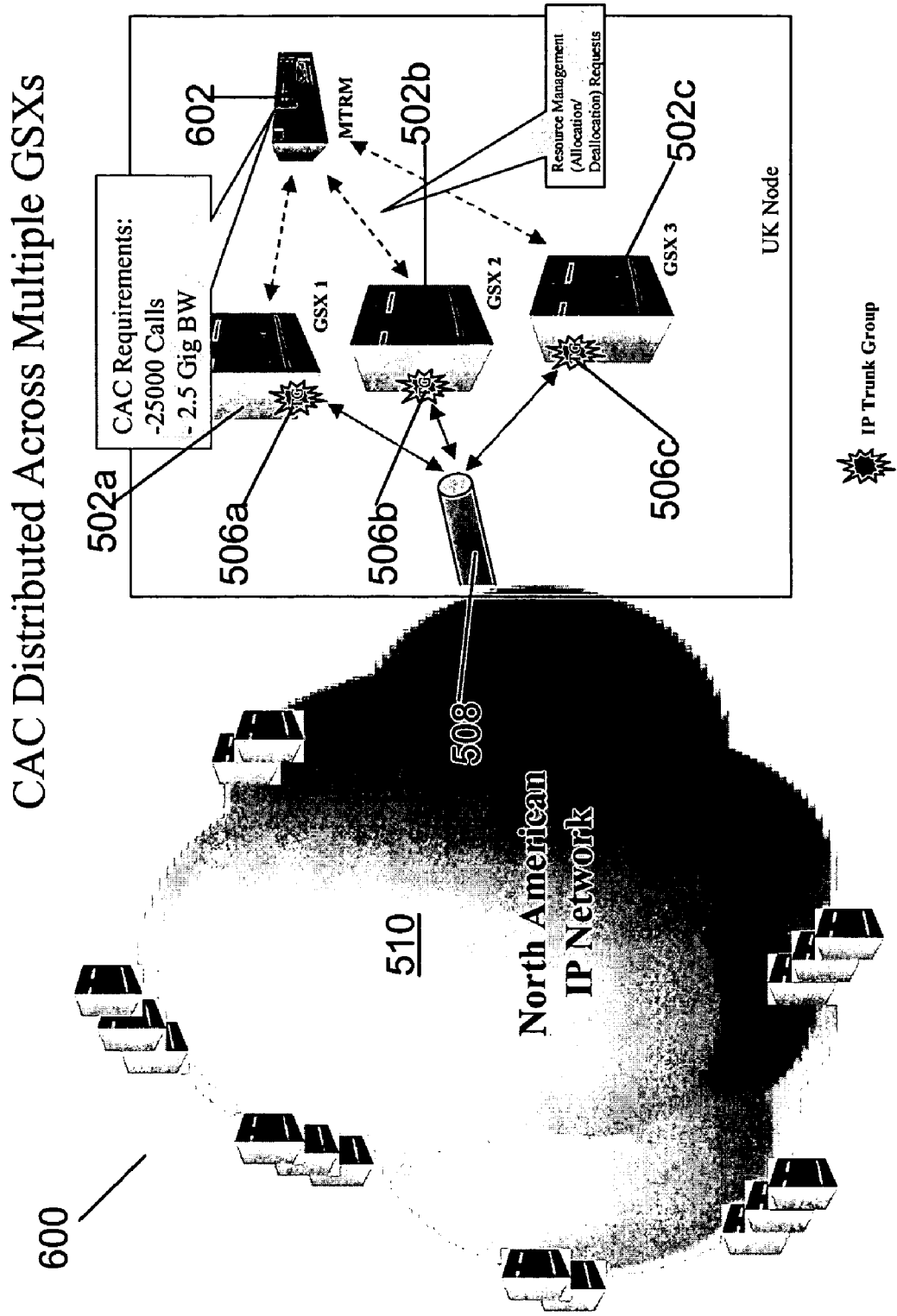

Referring now to FIG. 6, a block diagram of a system 600 including exemplary networks and devices including a component for centralized control of distributed network components within a logical network node is depicted. The system 600 of FIG. 6 includes the exemplary components depicted with respect to FIG. 5 with the addition of a resource manager 602. In one embodiment, the resource manager 602 provides monitoring and controlling functions for the logical trunk groups 506*a-c*. The resource manager 602 can be, for example, a module for managing and allocating resources among call processors in a network node (e.g., network node 504 of FIG. 5).

The resource manager 602 can be in communication with the call processors 502*a-c*. In some embodiments, the call processors 502*a-c* request resources or resource parameters from the resource manager 602 as data associated with calls are processed. In the illustrated embodiment, the resource manager 602 employs a failure-minimizing algorithm to determine resource allocation among the call processors 502*a-c*. One advantageous feature associated with the configuration of FIG. 6 includes no special routing requirements to distribute the call control features or access control to the call processors 502*a-c*. The resource manager 602 can also monitor and/or maintain statistics associated with data traffic associated with the logical trunk groups 506*a-c*. Such information can be accessible to other network components (not shown). In some embodiments, resource manager 602 can be analogous to the control component 306 depicted above with respect to FIG. 3.

Figure 7:
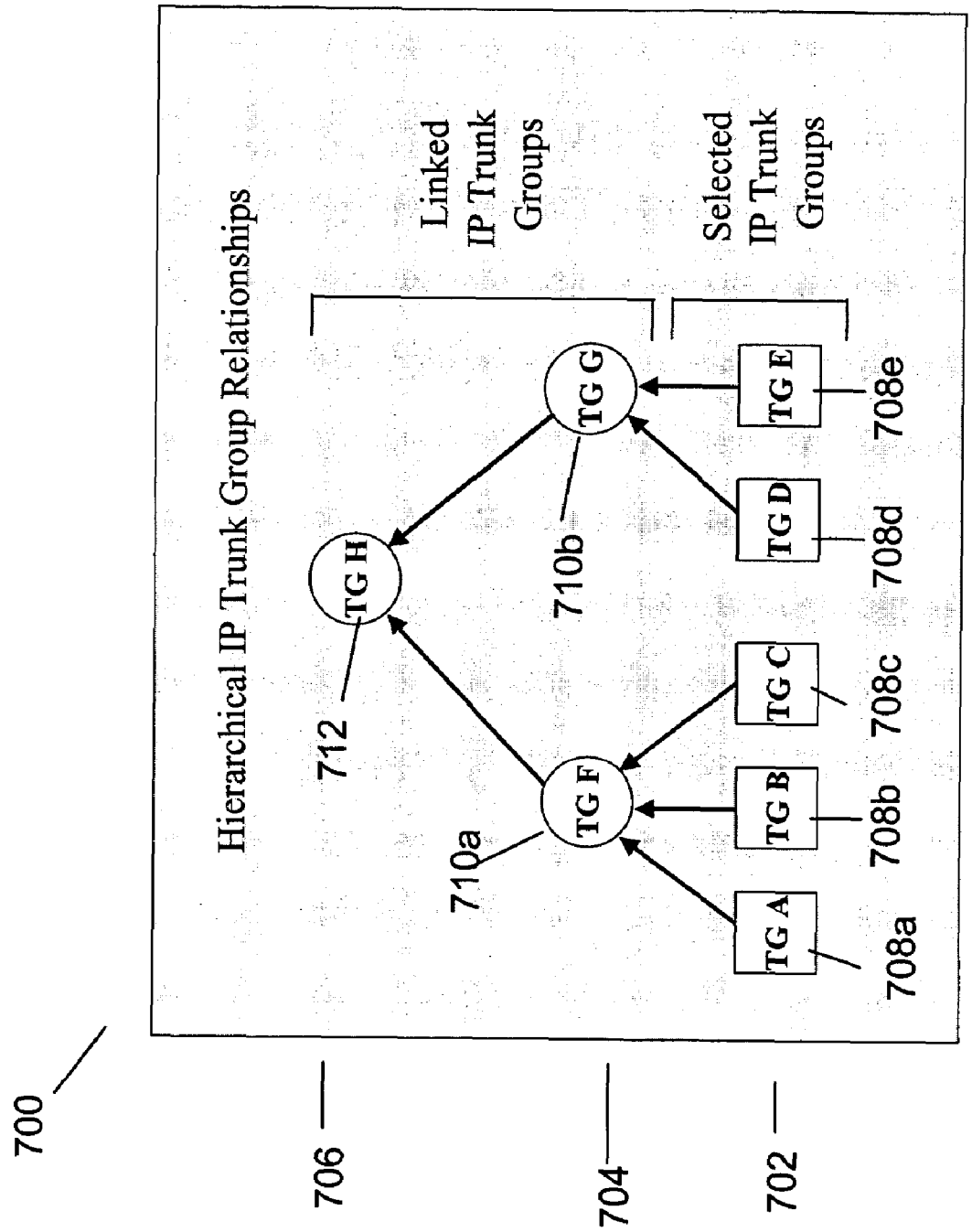
FIGS. 7-8 are block diagrams illustrating a hierarchical configuration of call controls and related implementations.

FIG. 7 depicts an exemplary hierarchical configuration 700 associated with call control. Three levels 702, 704, 706 of hierarchy are depicted. The lowest level 702 includes trunk groups 708*a-e*. In some embodiments, the trunk groups 708*a-e* include associated control features as described above (e.g., resource parameters and admission controls). The second level 704 of the hierarchical structure includes two hierarchical groups 710*a-b* including the logical trunk groups 708*a-e*. The first hierarchical group 710*a* includes three logical trunk groups 708*a-c*, and the second hierarchical group 710*b* includes two logical trunk groups 708*d-e*.

In some embodiments, the control features associated with logical trunk groups 708*a-c* are included in the hierarchical group 710*a* (e.g., amalgamated or combined to define the resource parameters of the group 710*a*). Additional control features may be associated with group 710*a* that are not included individually in any of trunk groups 708*a-c*. Likewise, the control features associated with logical trunk groups 708*d-e* are included in hierarchical group 710*b*, and additional control features may be associated with hierarchical group 710*b* that are not included individually in any of the logical trunk groups 708*d-e*. The third level 706 of the hierarchical structure includes a hierarchical combination 712 of the hierarchical groups 710*a-b*. Hierarchical combination 712 can include all of the control features associated with the hierarchical groups 710*a-b* and additional control features that are not included in either hierarchical group 710*a-b* or in any logical trunk groups 708*a-e*.

The resource parameter associated with the hierarchical combination 712 or hierarchical groups 710*a-b* can include scalar, vector, operational state parameters, or any combination of them, as described above with respect to FIGS. 3 and 4. If an administrator knows about a portion of the topology of the packet-based network (e.g., the topology on the node 504, then the hierarchical trunk group relationships (e.g., the hierarchical configuration 700) can advantageously be used for a logical representation of that network architecture or topology.

In some embodiments, the resource manager 602 of FIG. 6 includes the hierarchical configuration 700. The resource manager 602 can configure the resources among the call processors 502*a-c* either directly by allocating resources for the trunk groups 506*a-c* or by allocating resources to the control channel 508 to manage and control call traffic. Allocating resources to the control channel 508 is analogous to providing a configuration at the second level of hierarchy 704 or the third level of hierarchy 706.

The hierarchical configuration 700 affects call processing. For example, to use logical trunk group 708*a* for call processing (e.g., the resources and set of pathways associated with that logical trunk group), both the hierarchical group 710*a* and the hierarchical combination 712 should be in service (e.g., the operational state parameter associated with the hierarchical group 710*a* and the hierarchical combination 712 is not set to "out-of-service"). Similarly, individual logical trunk groups 708*a-e* can be removed from operational service by removing a hierarchical group 710*a-b* or the hierarchical combination 712 from operational service (e.g., associating an operational state of "out-of-service" with the hierarchical combination 712). More specifically, to prevent data transmission using logical trunk groups 708a-c, a user can associate or configure the hierarchical group 710a or hierarchical combination 712 with an operational state of "out-of-service" to prevent routing of data to pathways associated with logical trunk groups in subhierarchical levels (e.g., by using the GUI 400 of FIG. 4). One implementation of this concept is embodied in a peg counter. For example, when data is routed to the logical trunk group 708a and resources are not available in the hierarchical combination 712 for the data, the peg counter can be incremented in the logical trunk group 708a and the hierarchical group 710a, for example indicating a failure to allocate resources up the hierarchical configuration 700 (e.g., by the hierarchical combination 712).

Figure 8:
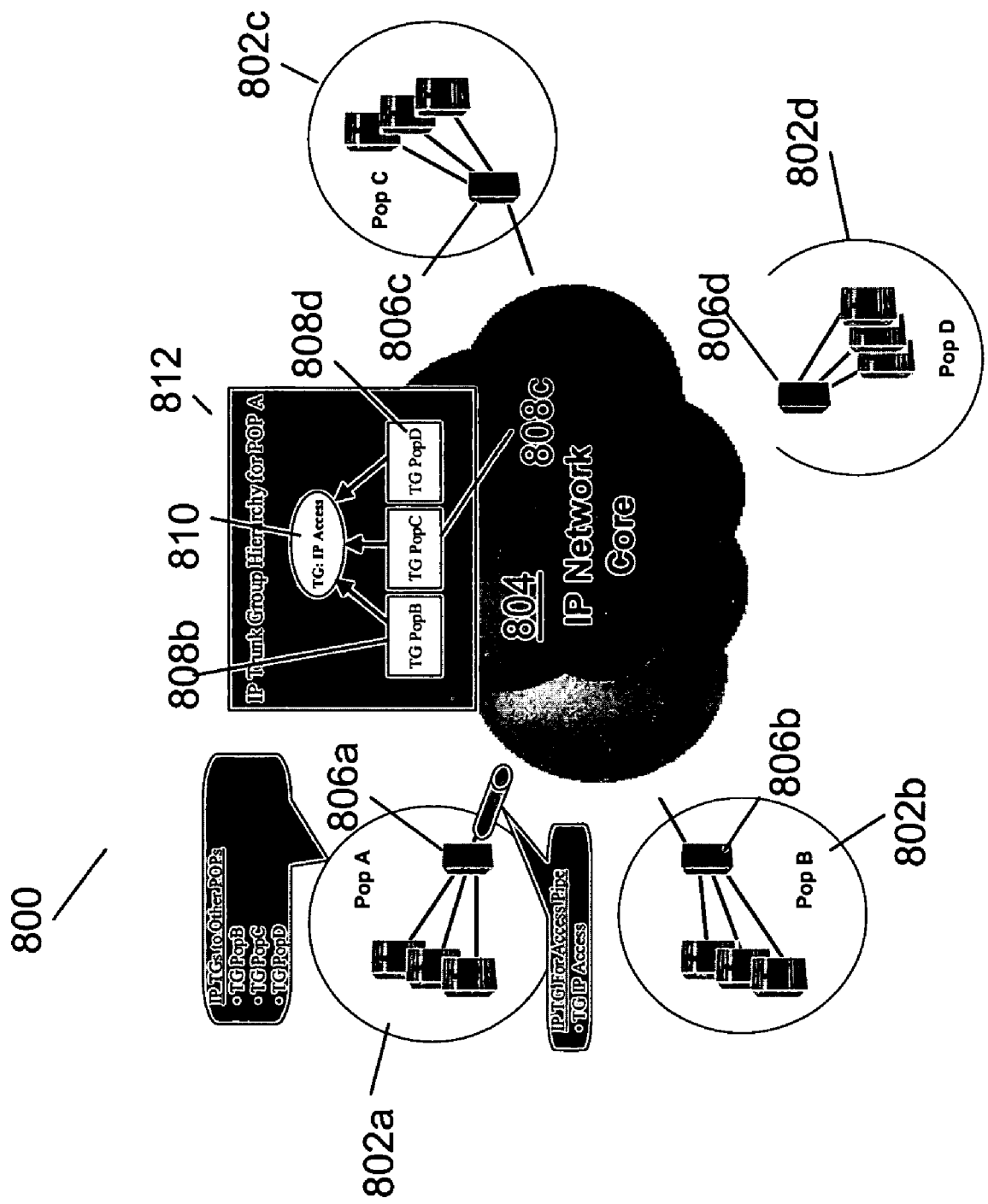

FIG. 8 depicts a system 800 including exemplary networks and devices employing a hierarchical configuration of call controls and related implementations. In the illustrated system 800, the configuration includes four network nodes 802a-d, which are groups including three media gateways, although in general, the network nodes can include a varying number of telephony equipment.

Generally, a network node (sometimes referred to as a point of presence ("POP")) can include a configuration in which network services are provided to subscribers that are connected to the network node (e.g., the network node 802a). The four network nodes 802a-d can each include interfaces to a packet-based network 804. The interfaces are depicted in FIG. 8 as multiplexers 806a-d, respectively. In some embodiments, one or more of the multiplexer 806a-d include the resource manager functionality of the resource manager 602 of FIG. 6 and can implement hierarchical control features described above with respect to FIG. 7. In some embodiments, the network equipment (e.g., a GSX9000 sold by Sonus Networks, Inc. of Chelmsford, Mass.) associated with each of the four network nodes 802a-d implements resource manager functionality. In still other embodiments, the configuration of FIG. 8 includes the resource manager 602 of FIG. 6 (not shown) to manage hierarchical control features.

In some embodiments, the multiplexers 806a-d are switching components. In a particular embodiment, each network node (e.g., the network node 802a) includes a set of logical trunk groups 808b-d configured for transmitting data to each of the other network nodes (e.g., the network nodes 802b-d), through the packet-based network 804. More specifically, the network node 802a can include a logical trunk group 808b "dedicated" to network node 802b (e.g., all calls routed between node 802a and node 802b are associated with the logical trunk group 808b), a logical trunk group 808c "dedicated" to network node 802c (e.g., all calls routed between node 802a and node 802c are associated with the logical trunk group 808c), and a logical trunk group 808d "dedicated" to network node 802d (e.g., all calls routed between node 802a and node 802d are associated with the logical trunk group 808d).

The logical trunk groups can be associated with a call or a call session. In some embodiments, the logical trunk groups are associated with call traffic. The logical trunk groups 808b-d can be combined to form a group or a combination as discussed above and represented in FIG. 8 by reference numeral 810. Block 812 illustrates an exemplary hierarchical configuration used by various of the network equipment for implementing hierarchical control features.

One advantage realized by a configuration including hierarchical control features includes the ability of an administrator associated with the network node 802a to control data transmission through the network 804 and to the other network nodes 802b-d by allocating resources associated with the group 810 or the logical trunk groups 808b-d associated with the group 810. Block 812 illustrates that the principle of a hierarchical configuration (e.g., the hierarchical configuration 700 of FIG. 7) can be implemented in the IP network 804, or the configuration can be implemented by other network equipment, for example the multiplexer 806a or a control component (not shown). A hierarchical resource allocation allows multiple trunk groups to share common resources without interfering with other trunk groups. For example, an administrator can track resources that are needed by a network node (e.g., the network node 802a) or between network nodes in the network 804.

As a specific example of control implementations associated with FIG. 8, a call and data associated with the call can originate in the network node 802a and terminate in the network node 802d. In such a configuration, the multiplexer 806a selects the set of pathways associated with the logical trunk group 808d to transmit the data through the network 804. Any data control features associated with the logical trunk group 808d, for example resource allocation or data admission, can then be implemented with respect to the data. Further, data control features associated with the group 810 can then be implemented with respect to the data.

When the control features have been implemented, the data can be transmitted to the packet-based network 804 for delivery to the network node 802d. In some embodiments, the multiplexer 806d receives the data from the network 804, determines which trunk group with which to associate the data (e.g., the logical trunk group 808d), and routes the data and the call according to control features associated with the logical trunk group 808d. Similar processing occurs for data transmitted from the network node 802d to the network node 802a (e.g., data associated with return call transmission).

In some embodiments, the performance of logical trunk groups (e.g., the individual logical trunk groups 808b-d and/or the hierarchical group logical trunk group 810) can be monitored by employing or analyzing performance statistics related to data associated with a call. Such statistics can be monitored, reported and recorded for a given time interval that can be configured by a user. The performance statistics can relate to the performance of various network equipment including IP trunk groups. The performance statistics allow an administrator monitor network performance and adjust or configure resource parameters to improve network performance (e.g., to provide a quality of service guarantee or a higher quality of service with respect to calls). Some of the exemplary statistics and a method for calculating each statistic are listed below in Table 3. The call performance statistics in Table 3 include industry standard statistics as they relate to management of PSTN trunk groups, for example the GR-477 standard described above. An advantage realized includes the application of statistics associated with PSTN trunk group management to management of packet-based networks to allow PSTN administrators to configure and administer packet-based networks with minimal retraining. Another advantage includes minimal retooling regarding network management operation tools for implementation of the features described herein with respect to logical trunk groups.

TABLE 3

| Performance Statistic | Associated Calculation |
| --- | --- |
| Inbound Usage | The sum of call-seconds for every inbound call associated with a logical trunk group. This statistic relates to the period between resource allocation and release. |
| Outbound Usage | The sum of call-seconds for every outbound call associated with a logical trunk group. This statistic relates to the period between resource allocation and release. |
| Inbound Completed Calls | The sum of normal call completions (answered calls) for every inbound call associated with a logical trunk group. |
| Outbound Completed Calls | The sum of normal call completions (answered calls) for every outbound call associated with a logical trunk group. |
| Inbound Call Attempts | The sum of call initiations for every inbound call associated with a trunk group. |
| Outbound Call Attempts | The sum of call initiations for every outbound call associated with a logical trunk group. |
| Maximum Active Calls | The maximum number of calls in either direction associated with a logical trunk group. This value can include an upper limit of the total number of calls allowed by the logical trunk group. |
| Call Setup Time | The sum of call-setup time in hundredths of seconds on every call associated with a logical trunk group. |
| Calls Setup | The number of calls setup in both directions using a logical trunk group. |
| Inbound & Outbound Call Failures due to No Routes | The current number of inbound or outbound failed calls because no route associated with a logical trunk group was available. |
| Inbound & Outbound Call Failures due to No Resources | The current number of inbound or outbound failed calls because available resource associated with a logical trunk group was available. |
| Inbound & Outbound Call Failures due to No Service | The current number of inbound or outbound failed calls because there was no available service associated with a logical trunk group. |
| Inbound & Outbound Call Failures due to Invalid Call | The current number of inbound or outbound failed calls because an invalid call attempt was associated with the logical trunk group. |
| Inbound & Outbound Call Failures due to Network Failure | The current number of inbound or outbound failed calls because a network failure was associated with a logical trunk group. |
| Inbound & Outbound Call Failures due to Protocol Error | The current number of inbound or outbound failed calls because a protocol error was associated with the logical trunk group. |
| Inbound & Outbound Call Failures due to Unspecified | The current number of inbound or outbound failed calls for an unknown reason associated with a logical trunk group. |
| Routing Attempts | The number of routing requests associated with a logical trunk group. |
| Failures due to no unreserved circuits | The current number of routing failures due to no unreserved routes available in association with a logical trunk group |
| SILC Count | The current number of calls cancelled due to selective incoming load control ("SILC") associated with a logical trunk group |
| STRCANT Count | The current number of calls cancelled due to selective trunk reservation ("STR") associated with a logical trunk group |
| STRSKIP Count | The current number of calls skipped (i.e., unload a call without canceling the call) due to STR associated with a logical trunk group |
| SKIP Count | The current number of calls skipped due to SKIP traffic control for a logical trunk group |
| CANT Count | The current number of call cancelled due to CANT (i.e., cancel to control - a control that cancels a percentage of all new data processing for an overloaded or impaired set of egress pathways) associated with a logical trunk group |
| CANF Count | The current number of call cancelled due to CANF (i.e., cancel from control - a control that cancels a percentage of all new data processing for an overloaded or impaired set of ingress pathways) associated with a logical trunk group |
| ACCCANT Count | The current number of calls cancelled due to automatic congestion control ("ACC") associated with a logical trunk group |
| ACCSKIP Count | The current number of calls skipped due to ACC in association with a logical trunk group |
| Route Attempts IRR Count | The current number of reroute attempts due to immediate rerouting ("IRR") associated with a logical trunk group |
| Route Attempts SIRR Count | The current number of reroute attempts due to immediate spray rerouting ("SIRR") associated with a logical trunk group |

TABLE 3-continued

| Performance Statistic | Associated Calculation |
| --- | --- |
| Route Attempts ORR Count | The current number of reroute attempts due to overflow rerouting ("ORR") associated with the logical trunk group |
| Route Attempts SORR Count | The current number of reroute attempts due to overflow spray rerouting ("SORR") associated with a logical trunk group |
| Successful IRR Count | The current number of successful reroutes due to IRR associated with the logical trunk group |
| Successful SIRR Count | The current number of successful reroutes due to SIRR associated with a logical trunk group |
| Successful ORR Count | The current number of successful reroutes due to ORR associated with a logical trunk group |
| Successful SORR Count | The current number of successful reroutes due to SORR associated with a logical trunk group. |

As can be seen with respect to Table 3, various performance statistics can be combined (e.g., determining a performance percentage associated with IRR routing from the number of attempts at rerouting and the number of successful reroutes). In some embodiments, the performance statistics can be detected or processed by a monitor, for example, a call processor (e.g., switching component 303 of FIG. 3) that is in communication with the logical trunk group. In other embodiments, the performance statistics can be detected or processed by a monitor remote from the logical trunk group, for example, a provisioning server or resource manager that is in communication with various network components (e.g., control component 306 of FIG. 3). In some embodiments, an administrator can monitor any of the statistics in Table 3 and adjust network or resource parameters based in part on the statistics to optimize network performance and quality of telephone calls.

In embodiments employing real-time control protocol ("RTCP") for data transmission control, statistics associated with media data associated with a call (e.g., teleconferencing or video data) are employed. Logical trunk groups and associated call processors can use statistics generated to determine call quality (e.g., the quality of data transmission). Statistics and call quality information allow a user to configure or change various resource parameters to maximize network efficiency and reliability.

Packet-based telephony networks can employ various signaling protocols in connection with data transmission. For example, a packet-based network can employ a signaling protocol (e.g., generically gateway-to-gateway signaling protocol) within the packet network 302 (e.g., the core packet-based network). Telephony networks external to the packet-based network (e.g., PSTN 308 and PSTN 318 of FIG. 3) can use other signaling protocols, for example, signaling system 7 ("SS7"), session initiation protocol ("SIP"), session initiation protocol for telephones ("SIP-T"), or H.323 signaling protocols or any combination of these.

Figure 9:
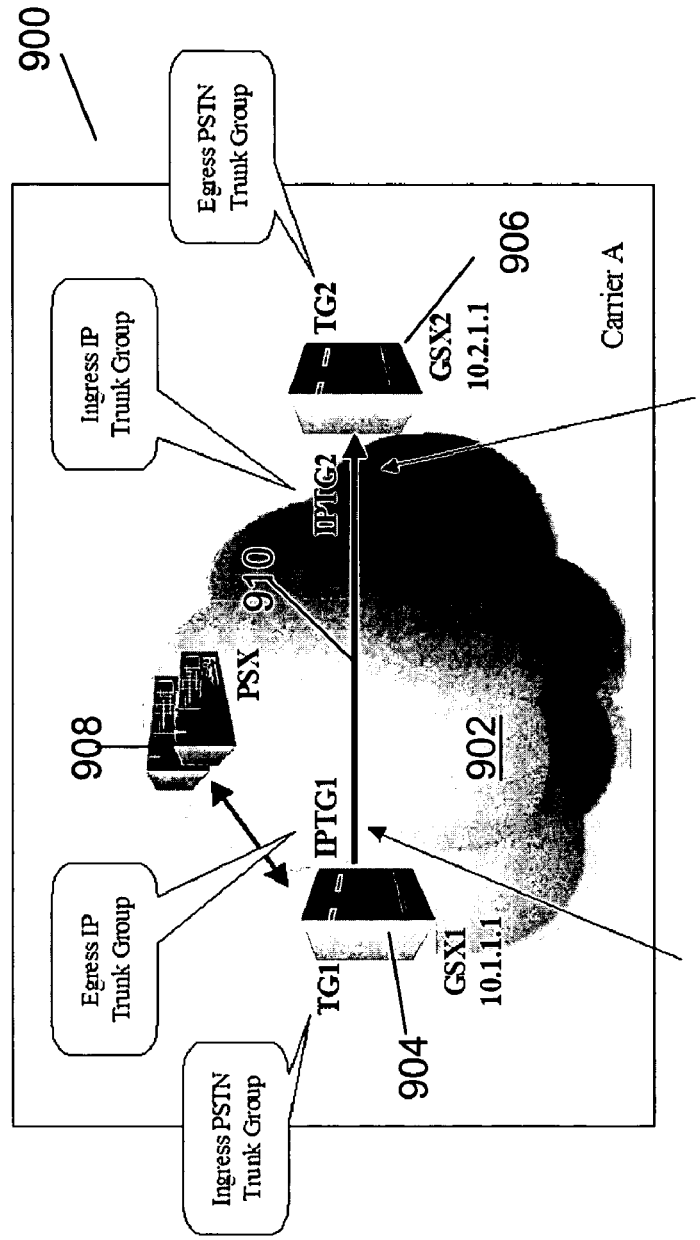
FIG. 9 is a block diagram illustrating exemplary networks and devices for call processing.

FIG. 9 depicts a system 900 including exemplary networks and devices for call processing. A network 902 includes a first call processor 904, a second call processor 906, and a policy processor 908. Either of the call processors 904, 906 can be, for example, a GSX9000, and the policy processor 908 can be, for example, a PSX policy server, both sold by Sonus Networks, Inc., of Chelmsford, Mass. The policy processor 908 can communicate with processor 904 or processor 906.

In some embodiments, the call processor 904 communicates data associated with a call to the call processor 906 using SIP signaling protocol. In an exemplary configuration for a call setup, a call arrives from a PSTN trunk group (not shown) at the call processor 904, and the call processor 904 signals a request to the policy processor 908. Such a request includes information (e.g., a characteristic) including ingress source (e.g., the PSTN or a PSTN trunk group), ingress gateway (e.g., the call processor 904), ingress trunk group (e.g., the ingress PSTN trunk group TG1), calling party number, called party number, among other information. Based in part on the characteristic, the policy processor 908 provides information associated with a set of pathways 910 associated with a logical trunk group through the network 902 to the call processor 904.

The information can include a destination processor (e.g., the call processor 906), an IP address of a destination processor, a destination trunk group (e.g., the PSTN trunk group that delivers the call to the recipient), information about the route, or any combination of these. In some embodiments, the policy processor 908 can specify the destination by name, an IP address, or the destination trunk group. Based on one or more of these characteristics, the call processor 904 associates the call with an IP trunk group.

For example, the call processor 904 can select a an IP trunk group with which to associate the call data, based in part on the information provided by the policy processor 908, by using a most specific address-matching algorithm from a selection table (e.g., as described above). After the IP trunk group has been selected (e.g., the IP trunk group IPTG1), control features associated with the selected trunk group (e.g., limit on number of calls) can be enforced with respect to the data (e.g., scalar, vector, or operational state parameters), as described above. If the IP trunk group (e.g., resources associated with the IP trunk group including the set of pathways) can accommodate the data, information associated with a call setup can be communicated to the call processor 906, which determines an ingress logical trunk group associated with the data (e.g., IP trunk group IPTG2), for example by using the signaling IP address of the incoming setup.

After the call processor 906 selects the IP trunk group (e.g., IP trunk group IPTG2), control features associated with that IP trunk group (e.g., bandwidth limit) are implemented with respect to the data, as described above. At this point two sets of control features have been enforced with respect to the data. If the ingress IP trunk group can accommodate the data, processor 906 can admit the data for processing and attempts to transmit the data to a destination, e.g., on a PSTN trunk group (not shown) associated with egress PSTN trunk group TG2. The call processor 906 can select the destination based on a characteristic associated with the destination, as described above. Performance measurements or traffic statistics can be tracked using the associated IP trunk groups.

While this embodiment has been described with respect to PSTN trunk groups, the features of the invention also apply to SIP signaling or H.323 signaling with an "Invite" to a call processor or SIP server rather than a direct communications as discussed with respect to a PSTN trunk group (call processors 904 can receive ingress call legs from an IP network and/or call processor 906 can transmit egress call legs to an IP network). Call processors 904 and 906 can also communicate with logical trunk groups associated with SIP signaling. While the invention has been described with respect to packetized data associated with a telephone call, principles and concepts herein described can apply more generally to any time-sensitive data.

The above-described techniques can be implemented in digital electronic circuitry, or in computer hardware, firmware, software, or in combinations of them. The implementation can be as a computer program product, e.g., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the invention by operating on input data and generating output. Method steps can also be performed by, and apparatus can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., IPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The terms "module" and "function," as used herein, mean, but are not limited to, a software or hardware component which performs certain tasks. A module may advantageously be configured to reside on addressable storage medium and configured to execute on one or more processors. A module may be fully or partially implemented with a general purpose integrated circuit ("IC"), FPGA, or ASIC. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. Additionally, the components and modules may advantageously be implemented on many different platforms, including computers, computer servers, data communications infrastructure equipment such as application-enabled switches or routers, or telecommunications infrastructure equipment, such as public or private telephone switches or private branch exchanges ("PBX"). In any of these cases, implementation may be achieved either by writing applications that are native to the chosen platform, or by interfacing the platform to one or more external application engines.

To provide for interaction with a user, the above described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components. The components of the system can be interconnected by any form or medium of digital data communications, e.g., a communications network. Examples of communications networks, also referred to as communications channels, include a local area network ("LAN") and a wide area network ("WAN"), e.g., the Internet, and include both wired and wireless networks. In some examples, communications networks can feature virtual networks or sub-networks such as a virtual local area network ("VLAN"). Unless clearly indicated otherwise, communications networks can also include all or a portion of the PSTN, for example, a portion owned by a specific carrier.

The computing system can include clients and servers. A client and server are generally remote from each other and typically interact through a communications network. The relationship of client and server arises by virtue of computer programs running on the respective computers and having a client-server relationship to each other.

The invention has been described in terms of particular embodiments. The alternatives described herein are examples for illustration only and not to limit the alternatives in any way. The steps of the invention can be performed in a different order and still achieve desirable results. Other embodiments are within the scope of the following claims.

What is claimed is:

1. A method comprising:
   collecting information relating to a state of a set of data packets associated with a telephone call through a packet-based network, wherein the state comprises a transmitted state, a received state, a queued state, a lost state, or any combination thereof;

associating the information with a logical trunk group from a plurality of logical trunk groups;

determining a performance statistic associated with one of the call, the logical trunk group, the packet-based network, or any combination thereof based in part on the information; and adjusting a resource parameter associated with the packet-based network in part in response to the performance statistic.

2. A method comprising:

receiving data including a first set of data packets associated with a call, the data including an identifier associated with the data, a data source or one or more data destinations;

associating the data with a logical trunk group selected from a plurality of logical trunk groups each in communication with the one or more data destinations over a packet-based network based in part on the identifier;

managing the call associated with the data through the packet-network based in part on the associated logical trunk group;

monitoring a state of the first set of data packets, wherein the state comprises a transmitted state, a received state, a queued state, a lost state, or any combination thereof; and determining a performance statistic associated with one of the call, the logical trunk group, the packet-based network, or any combination thereof based in part on the state.

3. The method of claim 2, wherein managing the call comprises accepting the call, denying the call, transforming the data, selecting a destination for the data, transmitting the call over the packet-based network, or any combination thereof.

4. The method of claim 2, wherein selecting a destination for the data comprises selecting a network node for transmitting the data.

5. The method of claim 2, further comprising associating a resource parameter with the logical trunk group, wherein managing is based in part on the resource parameter.

6. The method of claim 2, wherein the data source comprises a gateway, a call processor, a switch, a trunk group, or any combination thereof.

7. The method of claim 2, further comprising:

requesting a route through a packet-based network; and providing a route through the network, wherein the route comprises a pathway associated with the logical trunk group.

8. The method of claim 2, further comprising associating a resource parameter with the logical trunk group.

9. The method of claim 2, wherein the identifier comprises a name, an IP address, a signaling protocol, a transport service access point, a port, a VLAN identifier, or any combination thereof.

10. The method of claim 2, wherein the performance statistic is determined according to a PSTN-based standard.

11. The method of claim 10, wherein the PSTN-based standard comprises a Telcordia GR-477 standard.

12. The method of claim 2, further comprising adjusting the resource parameter associated with the packet-based network based in part on the performance statistic.

13. The method of claim 12, wherein the resource parameter is adjusted in part in response to a user-provided configuration.

14. The method of claim 13, wherein the user-provided configuration comprises packet outage duration, outage detection interval, number of calls detecting a packet outage, amount of data detecting a packet outage, or any combination thereof.

15. A method comprising:

receiving data including a first set of data packets associated with a call, the data including an identifier associated with the data, a data source or one or more data destinations;

associating the data with a logical trunk group selected from a plurality of logical trunk groups each in communication with the one or more data destinations over a packet-based network based in part on the identifier; and managing the call associated with the data through the packet-network based in part on the associated logical trunk group, comprising:

determining by a first layer a state of the data associated with the logical trunk group, such that the state provides an input to a second layer;

providing, by the second layer to a third layer, a resource parameter associated with the logical trunk group and the resource parameter requirement associated with a second set of data packets;

comparing by the third layer the resource parameter associated with the logical trunk group and a resource parameter requirement associated with the second set of data packets; and determining, based on the comparing, whether to associate a second set of data packets with the logical trunk group.

16. The method of claim 15, wherein managing the call comprises accepting the call, denying the call, transforming the data, selecting a destination for the data, transmitting the call over the packet-based network, or any combination thereof.

17. The method of claim 15, wherein selecting a destination for the data comprises selecting a network node for transmitting the data.

18. The method of claim 15, wherein the data source comprises a gateway, a call processor, a switch, a trunk group, or any combination thereof.

19. The method of claim 15, further comprising:

requesting a route through a packet-based network; and providing a route through the network, wherein the route comprises a pathway associated with the logical trunk group.

20. The method of claim 15, wherein the identifier comprises a name, an IP address, a signaling protocol, a transport service access point, a port, a VLAN identifier, or any combination thereof.

21. A method comprising:

receiving data associated with a call, the data including an identifier associated with the data, a data source or one or more data destinations;

associating the data with a logical trunk group selected from a plurality of logical trunk groups each in communication with the one or more data destinations over a packet-based network based in part on the identifier;

managing the call associated with the data through the packet-network based in part on the associated logical trunk group;

determining a performance statistic associated with the packet-based network based in part on a state of a set of data packets, wherein the state comprises at least one of a transmitted state, a received state, a queued state, a lost state, or any combination thereof; and adjusting a resource parameter associated with the packet-based network based in part on the performance statistic.

22. The method of claim 21, wherein the performance statistic is determined according to a PSTN-based standard.

23. The method of claim 22, wherein the PSTN-based standard comprises a Telcordia GR-477 standard.

24. The method of claim 21, wherein managing the call comprises accepting the call, denying the call, transforming the data, selecting a destination for the data, transmitting the call over the packet-based network, or any combination thereof.

25. The method of claim 21, wherein selecting a destination for the data comprises selecting a network node for transmitting the data.

26. The method of claim 21, further comprising associating the resource parameter with the logical trunk group, wherein managing is based in part on the resource parameter.

27. The method of claim 21, wherein the data source comprises a gateway, a call processor, a switch, a trunk group, or any combination thereof.

28. The method of claim 21, further comprising:
requesting a route through a packet-based network; and
providing a route through the network, wherein the route comprises a pathway associated with the logical trunk group.

29. The method of claim 21, further comprising associating the resource parameter with the logical trunk group.

30. The method of claim 21, wherein the identifier comprises a name, an IP address, a signaling protocol, a transport service access point, a port, a VLAN identifier, or any combination thereof.

31. The method of claim 21, wherein the resource parameter is adjusted in part in response to a user-provided configuration.

32. The method of claim 31, wherein the user-provided configuration comprises packet outage duration, outage detection interval, number of calls detecting a packet outage, amount of data detecting a packet outage, or any combination thereof.

33. A method comprising:
receiving data associated with a call, the data including an identifier associated with the data, a data source or one or more data destinations;
associating the data with a logical trunk group selected from a plurality of logical trunk groups each in communication with the one or more data destinations over a packet-based network based in part on the identifier;
managing the call associated with the data through the packet-network based in part on the associated logical trunk group;
associating a resource parameter with the logical trunk group or a second logical trunk group or both, wherein the resource parameter comprises a scalar parameter, a vector parameter, an operational state parameter, or any combination thereof; and
adjusting the resource parameter in part in response to a state associated with the data, wherein the state comprises a transmitted state, a received state, a queued state, a lost state, or any combination thereof.

34. The method of claim 33, wherein the resource parameter is adjusted in part in response to a user-provided configuration.

35. The method of claim 34, wherein the user-provided configuration comprises packet outage duration, outage detection interval, number of calls detecting a packet outage, amount of data detecting a packet outage, or any combination thereof.

36. The method of claim 33, wherein managing the call comprises accepting the call, denying the call, transforming the data, selecting a destination for the data, transmitting the call over the packet-based network, or any combination thereof.

37. The method of claim 33, wherein selecting a destination for the data comprises selecting a network node for transmitting the data.

38. The method of claim 33, further comprising associating the resource parameter with the logical trunk group, wherein managing is based in part on the resource parameter.

39. The method of claim 33, wherein the data source comprises a gateway, a call processor, a switch, a trunk group, or any combination thereof.

40. The method of claim 33, further comprising:
requesting a route through a packet-based network; and
providing a route through the network, wherein the route comprises a pathway associated with the logical trunk group.

41. The method of claim 33, further comprising associating the resource parameter with the logical trunk group.

42. The method of claim 33, wherein the identifier comprises a name, an IP address, a signaling protocol, a transport service access point, a port, a VLAN identifier, or any combination thereof.

43. The method of claim 33, further comprising:
determining a performance statistic associated with the packet-based network based in part on the state, wherein the resource parameter associated with the packet-based network is adjusted based in part on the performance statistic.

44. The method of claim 33, wherein the performance statistic is determined according to a PSTN-based standard.

45. The method of claim 44, wherein the PSTN-based standard comprises a Telcordia GR-477 standard.

46. A computer-readable storage medium encoded with a computer program, the computer program comprising:
a switching module for communication with a packet-based network, the switching module configured to receive data associated with a call, the data associated with an identifier, wherein the identifier is associated with the data, a data source, or one or more data destinations;
a plurality of logical trunk groups associated with the switching module, each of the plurality of logical trunk groups associated with the one or more data destinations over the packet-based network;
a selector module configured to associate the data received by the switching module with a first logical trunk group selected from the plurality of logical trunk groups;
a managing module configured to manage the call associated with the data based in part on the associated logical trunk group;
a monitoring module configured to monitor a state of a set of data packets associated with the call, the state comprising a transmitted state, a received state, a queued, state, a lost state, or any combination thereof;
a calculation module configured to determine a performance statistic associated with one of the call, the logical trunk group, or the packet-based network based in part on the state; and
an adjustment module to adjust a resource parameter of the packet-based network based in part on the performance statistic.

47. A computer program product, tangibly embodied in a computer-readable storage medium, the computer program product including instructions being operable to cause data processing apparatus to:
- receive data associated with a call, the data including an identifier associated with the data, a data source, or one or more data destinations;
- associate the data with a first logical trunk group selected from a plurality of logical trunk groups each in communication with the one or more data destinations over a packet-based network;
- manage the call associated with the data based in part on the associated logical trunk group;
- determine a performance statistic associated with the packet-based network based in part on a state of a set of data packets, wherein the state comprises at least one of a transmitted state, a received state, a queued state, a lost state, or any combination thereof; and
- adjust a resource parameter associated with the packet-based network based in part on the performance statistic.

* * * * *

UNITED STATES PATENT AND TRADEMARK OFFICE
CERTIFICATE OF CORRECTION

PATENT NO.        : 7,602,710 B2                                    Page 1 of 1
APPLICATION NO. : 11/238682
DATED             : October 13, 2009
INVENTOR(S)      : Grippo et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1049 days.

Signed and Sealed this

Fifth Day of October, 2010

David J. Kappos
*Director of the United States Patent and Trademark Office*